(12) United States Patent
Jin

(10) Patent No.: US 10,492,095 B2
(45) Date of Patent: Nov. 26, 2019

(54) DATA TRANSMISSION METHOD AND APPARATUS

(71) Applicant: Huawei Technologies Co., Ltd., Shenzhen (CN)

(72) Inventor: Weisheng Jin, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 96 days.

(21) Appl. No.: 15/044,806

(22) Filed: Feb. 16, 2016

(65) Prior Publication Data
US 2016/0165481 A1 Jun. 9, 2016

Related U.S. Application Data

(63) Continuation of application No. PCT/CN2013/081685, filed on Aug. 16, 2013.

(51) Int. Cl.
*H04W 72/04* (2009.01)
*H04W 28/02* (2009.01)
(Continued)

(52) U.S. Cl.
CPC ...... *H04W 28/0263* (2013.01); *H04W 72/0486* (2013.01); *H04W 72/10* (2013.01); *H04W 48/18* (2013.01)

(58) Field of Classification Search
None
See application file for complete search history.

(56) References Cited

U.S. PATENT DOCUMENTS

| 2010/0080172 A1 | 4/2010 | Jin et al. |
| 2011/0122885 A1* | 5/2011 | Hedman ............. H04L 65/1016 370/412 |

(Continued)

FOREIGN PATENT DOCUMENTS

| CN | 102655665 A | 9/2012 |
| CN | 102892143 A | 1/2013 |

(Continued)

OTHER PUBLICATIONS

"$3^{rd}$ Generation Partnership Project; Technical Specification Group Radio Access Network; Study on WLAN/3GPP Radio Interworking (Release 12)," 3GPP TR 37.834, V0.3.0, pp. 1-14, $3^{rd}$ Generation Partnership Project, Valbonne, France (May 2013).

(Continued)

*Primary Examiner* — Kodzovi Acolatse
(74) *Attorney, Agent, or Firm* — Leydig, Voit & Mayer, Ltd.

(57) ABSTRACT

Embodiments of the present disclosure provide a data transmission method and an apparatus. The method includes: receiving, by user equipment UE, indication information sent by an access node of a cellular access network, where the indication information includes a filtering condition, and the indication information is used to instruct the UE to transmit, by using a wireless local area network WLAN, a traffic flow that meets the filtering condition; determining, by the UE according to the indication information, that a first traffic flow meets the filtering condition; and transmitting, by the UE, the first traffic flow by using the WLAN. Therefore, according to an indication of the access node of the cellular access network, the UE may choose to transmit the traffic flow by using the WLAN, thereby improving data transmission efficiency.

9 Claims, 11 Drawing Sheets

A UE receives indication information sent by an access node of a cellular access network, where the indication information includes a filtering condition, and the indication information is used to instruct the UE to transmit, by using a WLAN, a traffic flow that meets the filtering condition — S101

The UE determines, according to the indication information, that a first traffic flow meets the filtering condition — S102

The UE transmits the first traffic flow by using the WLAN — S103

(51) Int. Cl.
*H04W 72/10* (2009.01)
*H04W 48/18* (2009.01)

(56) References Cited

U.S. PATENT DOCUMENTS

| | | | |
|---|---|---|---|
| 2011/0188376 A1 | 8/2011 | Stupar et al. | |
| 2012/0188949 A1* | 7/2012 | Salkintzis | H04L 45/308 370/329 |
| 2013/0143542 A1 | 6/2013 | Kovvali et al. | |
| 2013/0272287 A1* | 10/2013 | Xiang | H04W 48/14 370/338 |
| 2014/0022898 A1* | 1/2014 | Kim | H04W 8/22 370/230 |
| 2014/0064068 A1* | 3/2014 | Horn | H04W 28/0289 370/230 |
| 2014/0071854 A1* | 3/2014 | Xiang | H04W 48/16 370/254 |
| 2014/0092742 A1* | 4/2014 | Chou | H04W 52/0225 370/235 |
| 2014/0133298 A1 | 5/2014 | Han et al. | |
| 2014/0153546 A1* | 6/2014 | Kim | H04W 48/18 370/332 |
| 2014/0161026 A1* | 6/2014 | Stojanovski | H04L 45/22 370/328 |
| 2014/0204909 A1* | 7/2014 | Cheng | H04W 8/082 370/331 |
| 2015/0223134 A1* | 8/2015 | Hou | H04W 36/0011 370/331 |

FOREIGN PATENT DOCUMENTS

| | | |
|---|---|---|
| EP | 2720508 A1 | 4/2014 |
| RU | 2484603 C2 | 6/2013 |
| WO | WO 2012171456 A1 | 12/2012 |

OTHER PUBLICATIONS

"3$^{rd}$ Generation Partnership Project; Technical Specification Group Services and System Aspects; Study on WLAN network selection for 3GPP terminals (Stage 2) (Release 12)," 3GPP TR 23.865, V1.1.1, pp. 1-45, 3$^{rd}$ Generation Partnership Project, Valbonne, France (Jul. 2013).

"3$^{rd}$ Generation Partnership Project; Technical Specification Group Services and System Aspects; Architecture enhancements for non-3GPP accesses (Release 12)," 3GPP TS 23.402, V12.1.0, pp. 1-254, 3$^{rd}$ Generation Partnership Project, Valbonne, France (Jun. 2013).

* cited by examiner

DATA TRANSMISSION METHOD AND APPARATUS

CROSS-REFERENCE TO RELATED APPLICATIONS

This application is a continuation of International Patent Application No. PCT/CN2013/081685, filed on Aug. 16, 2013, which is hereby incorporated by reference in its entirety.

TECHNICAL FIELD

Embodiments of the present disclosure relate to the field of communications technologies, and in particular, to a data transmission method and an apparatus.

BACKGROUND

With rapid popularization of intelligent terminals and mobile applications in recent years, a mobile communications network has also gained rapid development. Meanwhile, data communication load that a cellular access network needs to bear also becomes increasingly heavy. However, advance of technologies helps a wireless local area network (WLAN) achieve an increasingly high data throughput. In addition, compared with a cellular access network, the WLAN has low network deployment costs and OPEX and supported by a large number of terminals. Therefore, a part of data transmitted by using the cellular access network by user equipment (UE) may be offloaded to the WLAN for transmission, thereby reducing load of data transmission in an existing mobile communications network.

In the prior art, an access network discovery and selection function (ANDSF) entity is disposed in a core network, and the ANDSF entity sends an inter-system routing policy (ISRP) to a UE by using a user plane. The ISRP includes at least one type of a flow based (Flow based) routing policy, and each flow based routing policy includes at least one routing rule. Therefore, the UE may determine, according to a description and a rule priority of a to-be-sent traffic flow, a flow based routing policy that matches the traffic flow; determine, according to an access network priority, a routing rule in the flow based routing policy that matches the traffic flow; then, the UE sends out the traffic flow by using an access network specified in the routing rule, where the access network is a cellular access network or a WLAN. In this way, the UE can transmit data by using the cellular access network and the WLAN.

However, an ISRP is application layer information, and the UE needs to send an ISRP received from an application layer to a communications module at a bottom layer of the UE for processing; there is an extra matching operation at the bottom layer of the UE in addition to existing flow matching executed by using a filter for a cellular access network transmission bearer, which causes complex implementation of a process in which the UE selects a WLAN route for a traffic flow. In addition, because update of the ISRP as an application layer approach is slow, it is difficult to consider dynamic information of the cellular access network and the WLAN network during generation of the ISRP, which results in low efficiency when the UE selects, according to the ISRP, the WLAN to transmit data.

SUMMARY

Embodiments of the present disclosure provide a data transmission method and an apparatus, which are intended to simplify a process of selecting, by a UE, a WLAN route for a traffic flow, and improve data transmission efficiency.

According to a first aspect, an embodiment of the present disclosure provides a data transmission method, including:

receiving, by user equipment UE, indication information sent by an access node of a cellular access network, where the indication information includes a filtering condition, and the indication information is used to instruct the UE to transmit, by using a wireless local area network WLAN, a traffic flow that meets the filtering condition;

determining, by the UE according to the indication information, that a first traffic flow meets the filtering condition; and transmitting, by the UE, the first traffic flow by using the WLAN.

In a first possible implementation manner of the first aspect, the filtering condition includes a first identifier, where the first identifier includes at least one of a transmission characteristic identifier and a filter identifier, and the transmission characteristic identifier corresponds to the filter identifier; and the determining, by the UE according to the indication information, that a first traffic flow meets the filtering condition includes:

determining, by the UE, if the first traffic flow matches a first filter and filter information of the first filter includes the first identifier, that the first traffic flow meets the filtering condition.

With reference to the first possible implementation manner of the first aspect, in a second possible implementation manner of the first aspect, the filtering condition further includes a bearer identifier; and the determining, by the UE according to the indication information, that a first traffic flow meets the filtering condition further includes:

determining, by the UE, that the first filter is a filter of a bearer corresponding to the bearer identifier.

With reference to the second possible implementation manner of the first aspect, in a third possible implementation manner of the first aspect, the filtering condition further includes a packet data network PDN connection identity or a PDN identity; and the determining, by the UE according to the indication information, that a first traffic flow meets the filtering condition further includes:

determining, by the UE, that the bearer corresponding to the bearer identifier is a bearer of a PDN connection corresponding to the PDN connection identity, or determining, by the UE, that the bearer corresponding to the bearer identifier is a bearer of a PDN connection corresponding to the PDN identity.

With reference to the first possible implementation manner of the first aspect, in a fourth possible implementation manner of the first aspect, the filtering condition further includes a PDN connection identity or a PDN identity; and the determining, by the UE according to the indication information, that a first traffic flow meets the filtering condition further includes:

determining, by the UE, that the first filter is a filter of a PDN connection corresponding to the PDN connection identity, or determining, by the UE, that the first filter is a filter of a PDN connection corresponding to the PDN identity.

In a fifth possible implementation manner of the first aspect, the filtering condition includes a transmission characteristic identifier; and the determining, by the UE according to the indication information, that a first traffic flow meets the filtering condition includes:

determining, by the UE, if a transmission characteristic identifier of an application program corresponding to the first traffic flow is the transmission characteristic identifier, that the first traffic flow meets the filtering condition.

With reference to the first possible implementation manner of the first aspect, or the second possible implementation manner of the first aspect, or the third possible implementation manner of the first aspect, or the fourth possible implementation manner of the first aspect, or the fifth possible implementation manner of the first aspect, in a sixth possible implementation manner of the first aspect, the transmission characteristic identifier is at least one identifier of a radio access technology RAT selection priority identifier, an Internet Protocol IP address preservation requirement identifier, and a traffic flow importance identifier; or the transmission characteristic identifier is used to identify a combination of at least one piece of information of RAT selection priority information, IP address preservation requirement information, and traffic flow importance information.

With reference to any one possible implementation manner of the first to the sixth implementation manners of the first aspect, in a seventh possible implementation manner of the first aspect, before the receiving, by user equipment UE, indication information sent by an access node of a cellular access network, the method further includes:

receiving, by the UE, a traffic flow template TFT sent by a policy and charging enforcement function PCEF entity, where the TFT includes the filter information of the filter that matches the first traffic flow, and the filter information includes the transmission characteristic identifier.

In an eighth possible implementation manner of the first aspect, the filtering condition includes a bearer identifier; and the determining, by the UE according to the indication information, that a first traffic flow meets the filtering condition includes:

determining, by the UE, if the first traffic flow matches a first filter and the first filter is a filter of a bearer corresponding to the bearer identifier, that the first traffic flow meets the filtering condition.

With reference to the eighth possible implementation manner of the first aspect, in a ninth possible implementation manner of the first aspect, the filtering condition further includes a PDN connection identity or a PDN identity; and the determining, by the UE according to the indication information, that a first traffic flow meets the filtering condition further includes:

determining, by the UE, that the bearer corresponding to the bearer identifier is a bearer of a PDN connection corresponding to the PDN connection identity, or determining, by the UE, that the bearer corresponding to the bearer identifier is a bearer of a PDN connection corresponding to the PDN identity.

With reference to the first aspect, or any one possible implementation manner of the first to the ninth implementation manners of the first aspect, in a tenth possible implementation manner of the first aspect, the indication information further includes an indication indicating whether to preserve an IP address of the UE; and the indication information is further used to indicate whether to use, when the UE transmits the first traffic flow by using the WLAN, an IP address of the UE when the access node of the cellular access network transmits the first traffic flow.

With reference to the first aspect, or any one possible implementation manner of the first to the tenth implementation manners of the first aspect, in an eleventh possible implementation manner of the first aspect, before the receiving, by user equipment UE, indication information sent by an access node of a cellular access network, the method further includes:

sending, by the UE, capability information of the UE to the access node of the cellular access network, where the capability information of the UE indicates whether the UE supports data transmission both on the cellular access network and on the WLAN.

With reference to the first aspect, or any one possible implementation manner of the first to the eleventh implementation manners of the first aspect, in a twelfth possible implementation manner of the first aspect, the transmitting, by the UE, the first traffic flow by using the WLAN includes:

transmitting, by the UE, the first traffic flow to the PCEF entity by using the WLAN.

According to a second aspect, an embodiment of the present disclosure provides a data transmission method, including:

determining, by an access node of a cellular access network, indication information, where the indication information includes a filtering condition, and the indication information is used to instruct user equipment UE to transmit, by using a wireless local area network WLAN, a traffic flow that meets the filtering condition; and sending, by the access node of the cellular access network, the indication information to the UE.

In a first possible implementation manner of the second aspect, the method further includes:

receiving, by the access node of the cellular access network, a first message sent by a policy and charging enforcement function PCEF entity, where the first message includes a transmission characteristic identifier, or includes the transmission characteristic identifier and a filter identifier corresponding to the transmission characteristic identifier; and determining, by the access node of the cellular access network according to the transmission characteristic identifier, that a traffic flow that matches a filter corresponding to the transmission characteristic identifier is to be transmitted by using the WLAN, where the traffic flow that meets the filtering condition is the traffic flow that matches the filter corresponding to the transmission characteristic identifier.

With reference to the first possible implementation manner of the second aspect, in a second possible implementation manner of the second aspect, the filtering condition includes a first identifier, where the first identifier includes at least one of a transmission characteristic identifier and a filter identifier, and the transmission characteristic identifier corresponds to the filter identifier; and the traffic flow that meets the filtering condition includes:

a first traffic flow, where the first traffic flow matches a first filter and filter information of the first filter includes the first identifier.

With reference to the second possible implementation manner of the second aspect, in a third possible implementation manner of the second aspect, the filtering condition further includes a bearer identifier, where the first filter is a filter of a bearer corresponding to the bearer identifier.

With reference to the third possible implementation manner of the second aspect, in a fourth possible implementation manner of the second aspect, the filtering condition further includes a packet data network PDN connection identity or a PDN identity, where the bearer corresponding to the bearer identifier is a bearer of a PDN connection corresponding to the PDN connection identity, or the bearer corresponding to the bearer identifier is a bearer of a PDN connection corresponding to the PDN identity.

With reference to the second possible implementation manner of the second aspect, in a fifth possible implementation manner of the second aspect, the filtering condition further includes a packet data network PDN connection identity or a PDN identity, where the first filter is a filter of a PDN connection corresponding to the PDN connection identity, or the first filter is a filter of a PDN connection corresponding to the PDN identity.

With reference to the first possible implementation manner of the second aspect, in a sixth possible implementation manner of the second aspect, the filtering condition includes the transmission characteristic identifier; and the traffic flow that meets the filtering condition includes:

a first traffic flow, where a transmission characteristic identifier of an application program corresponding to the first traffic flow is the transmission characteristic identifier.

With reference to any one possible implementation manner of the first to the sixth implementation manners of the second aspect, in a seventh possible implementation manner of the second aspect, the transmission characteristic identifier is at least one identifier of a radio access technology RAT selection priority identifier, an IP address preservation requirement identifier, and a traffic flow importance identifier; or the transmission characteristic identifier is used to identify a combination of at least one piece of information of RAT selection priority information, IP address preservation requirement information, and traffic flow importance information.

With reference to the first possible implementation manner of the second aspect, in an eighth possible implementation manner of the second aspect, the filtering condition further includes a bearer identifier; and the traffic flow that meets the filtering condition includes:

a first traffic flow, where the first traffic flow matches a first filter and the first filter is a filter of a bearer corresponding to the bearer identifier.

With reference to the eighth possible implementation manner of the second aspect, in a ninth possible implementation manner of the second aspect, the filtering condition further includes a PDN connection identity or a PDN identity; and the bearer corresponding to the bearer identifier is a bearer of a PDN connection corresponding to the PDN connection identity, or the bearer corresponding to the bearer identifier is a bearer of a PDN connection corresponding to the PDN identity.

With reference to the second aspect, or any one possible implementation manner of the first to the ninth implementation manners of the second aspect, in a tenth possible implementation manner of the second aspect, the indication information further includes an indication indicating whether to preserve an IP address of the UE; and the indication information is further used to indicate whether to use, when the UE transmits the first traffic flow by using the WLAN, an IP address of the UE when the access node of the cellular access network transmits the first traffic flow.

With reference to any one possible implementation manner of the first to the tenth implementation manners of the second aspect, in an eleventh possible implementation manner of the second aspect, the determining, by the access node of the cellular access network according to the transmission characteristic identifier, that a traffic flow that matches a filter corresponding to the transmission characteristic identifier is to be transmitted by using the WLAN includes:

determining, by the access node of the cellular access network according to the transmission characteristic identifier and a combination of one or more types of the following information: a load status of the cellular access network, a load status of the WLAN, capability information of the UE, and a network connection state of the UE, that the traffic flow that matches the filter corresponding to the transmission characteristic identifier is to be transmitted by using the WLAN, where the capability information of the UE indicates whether the UE supports data transmission both on the cellular access network and on the WLAN, and the network connection state is whether the UE has accessed the WLAN.

With reference to the eleventh possible implementation manner of the second aspect, in a twelfth possible implementation manner of the second aspect, the method further includes:

receiving, by the access node of the cellular access network, the capability information that is of the UE and is sent by the UE.

With reference to any one possible implementation manner of the first to the tenth implementation manners of the second aspect, in a thirteenth possible implementation manner of the second aspect, the determining, by the access node of the cellular access network according to the transmission characteristic identifier, that a traffic flow that matches a filter corresponding to the transmission characteristic identifier is to be transmitted by using the WLAN includes:

receiving, by the access node of the cellular access network, a second traffic flow sent by the PCEF entity, where the second traffic flow carries the transmission characteristic identifier, and the transmission characteristic identifier corresponds to a filter that matches the second traffic flow;

separately collecting, by the access node of the cellular access network during a preset time, statistics about a combination of one or more types of the following information of the second traffic flow: traffic of the second traffic flow, a proportion of the traffic of the second traffic flow in traffic of all downlink traffic flows of the UE, a proportion of the traffic of the second traffic flow in traffic of a bearer that bears the second traffic flow, and a proportion of the traffic of the second traffic flow in traffic of a packet data network PDN connection by using which the second traffic flow is transmitted; and determining, by the access node of the cellular access network according to the statistics collected about the combination of one or more types of the information of the second traffic flow, that the traffic flow that matches the filter corresponding to the transmission characteristic identifier is to be transmitted by using the WLAN.

With reference to the thirteenth possible implementation manner of the second aspect, in a fourteenth possible implementation manner of the second aspect, a differentiated services code point DSCP in an Internet Protocol IP header of a data packet of the second traffic flow carries the transmission characteristic identifier, or a header of a GPRS Tunneling Protocol for the user plane GTP-U packet that bears a data packet of the second traffic flow carries the transmission characteristic identifier.

With reference to any one possible implementation manner of the first to the fourteenth implementation manners of the second aspect, in a fifteenth possible implementation manner of the second aspect, the method further includes:

sending, by the access node of the cellular access network, downlink indication information to the PCEF entity, where the downlink indication information instructs the PCEF entity to transmit, by using the WLAN, the traffic flow that matches the filter corresponding to the transmission characteristic identifier.

With reference to the fifteenth possible implementation manner of the second aspect, in a sixteenth possible implementation manner of the second aspect, the downlink indication information further includes the PDN connection identity or the PDN identity, where the traffic flow that matches the filter corresponding to the transmission characteristic identifier is a traffic flow of the PDN connection corresponding to the PDN connection identity, or the traffic flow that matches the filter corresponding to the transmission characteristic identifier is a traffic flow of the PDN connection corresponding to the PDN identity.

According to a third aspect, an embodiment of the present disclosure provides a data transmission method, including:

receiving, by a policy and charging enforcement function PCEF entity, a transmission characteristic identifier sent by a policy and charging rules function PCRF entity; and sending, by the PCEF entity, a first message to an access node of a cellular access network, where the first message includes the transmission characteristic identifier, or includes the transmission characteristic identifier and a filter identifier corresponding to the transmission characteristic identifier, and the transmission characteristic identifier is used to instruct the access node of the cellular access network to determine whether a traffic flow that matches a filter corresponding to the transmission characteristic identifier is to be transmitted by using a wireless local area network WLAN.

In a first possible implementation manner of the third aspect, the receiving, by a policy and charging enforcement function PCEF entity, a transmission characteristic identifier sent by a policy and charging rules function PCRF entity includes:

receiving, by the PCEF entity, a policy control and charging PCC rule sent by the PCRF entity, where the PCC rule includes the filter corresponding to the transmission characteristic identifier, filter information of the filter, and quality of service QoS information corresponding to the filter, and the filter information of the filter includes the transmission characteristic identifier.

With reference to the first possible implementation manner of the third aspect, in a second possible implementation manner of the third aspect, the method further includes:

determining, by the PCEF entity according to the QoS information, a bearer that transmits the traffic flow that matches the filter;

adding, by the PCEF entity, the filter and the filter information of the filter to a traffic flow template TFT corresponding to the bearer; and sending, by the PCEF entity, the TFT to a UE.

With reference to the first possible implementation manner of the third aspect, in a third possible implementation manner of the third aspect, the method further includes:

determining, by the PCEF entity according to the transmission characteristic identifier, a bearer that transmits the traffic flow that matches the filter;

adding, by the PCEF entity, the filter to a TFT corresponding to the bearer; and sending, by the PCEF entity, the TFT to a UE.

With reference to the third aspect, or the first possible implementation manner of the third aspect, or the second possible implementation manner of the third aspect, or the third possible implementation manner of the third aspect, in a fourth possible implementation manner of the third aspect, the transmission characteristic identifier is at least one identifier of a radio access technology RAT selection priority identifier, an IP address preservation requirement identifier, and a traffic flow importance identifier; or the transmission characteristic identifier is used to identify a combination of at least one piece of information of RAT selection priority information, IP address preservation requirement information, and traffic flow importance information.

With reference to the third aspect, or the first possible implementation manner of the third aspect, or the second possible implementation manner of the third aspect, or the third possible implementation manner of the third aspect, or the fourth possible implementation manner of the third aspect, in a fifth possible implementation manner of the third aspect, the method further includes:

receiving, by the PCEF entity, capability information that is of the UE and is sent by the access node of the cellular access network, where the capability information of the UE indicates whether the UE supports data transmission both on the cellular access network and on the WLAN.

With reference to the fifth possible implementation manner of the third aspect, in a sixth possible implementation manner of the third aspect, the method further includes:

sending, by the PCEF entity, the capability information of the UE to the PCRF entity, so that the PCRF entity formulates the PCC rule according to a capability of the UE.

With reference to any one possible implementation manner of the first to the sixth implementation manners of the third aspect, in a seventh possible implementation manner of the third aspect, the method further includes:

when the capability information of the UE indicates that the UE supports data transmission both on the cellular access network and on the WLAN, determining, by the PCEF entity, to send a third traffic flow to the UE by using the WLAN, where the third traffic flow is the traffic flow that matches the filter corresponding to the transmission characteristic identifier.

With reference to the seventh possible implementation manner of the third aspect, in an eighth possible implementation manner of the third aspect, the determining, by the PCEF entity, to send a third traffic flow to the UE by using the WLAN includes:

determining, by the PCEF entity according to a first traffic flow that is sent by the UE and received by using the WLAN, to send the third traffic flow to the UE by using the WLAN, where the first traffic flow is the traffic flow that matches the filter corresponding to the transmission characteristic identifier.

With reference to the seventh possible implementation manner of the third aspect, in a ninth possible implementation manner of the third aspect, the determining, by the PCEF entity, to send a first traffic flow to the UE by using the WLAN includes:

determining, by the PCEF entity according to a preset policy, to send the third traffic flow to the UE by using the WLAN.

With reference to the seventh possible implementation manner of the third aspect, in a tenth possible implementation manner of the third aspect, the determining, by the PCEF entity, to send a first traffic flow to the UE by using the WLAN includes:

determining, by the PCEF entity according to downlink indication information sent by the access node of the cellular access network, to send the third traffic flow to the UE by using the WLAN, where the downlink indication information is used to instruct the PCEF entity to transmit, by using the WLAN, the traffic flow that matches the filter corresponding to the transmission characteristic identifier.

With reference to the tenth possible implementation manner of the third aspect, in an eleventh possible implementation manner of the third aspect, the downlink indication information further includes a PDN connection identity or a PDN identity, where the traffic flow that matches the filter corresponding to the transmission characteristic identifier is a traffic flow of a PDN connection corresponding to the PDN connection identity, or the traffic flow that matches the filter corresponding to the transmission characteristic identifier is a traffic flow of a PDN connection corresponding to the PDN identity.

According to a fourth aspect, an embodiment of the present disclosure provides a data transmission method, including:

formulating, by a policy and charging rules function PCRF entity, a policy control and charging PCC rule; and sending, by the PCRF entity, the PCC rule to a policy and charging enforcement function PCEF entity, where the PCC rule includes a transmission characteristic identifier, and the transmission characteristic identifier is used to instruct an access node of a cellular access network to determine whether a traffic flow that matches a filter corresponding to the transmission characteristic identifier is to be transmitted by using a wireless local area network WLAN.

In a first possible implementation manner of the fourth aspect, the formulating, by a policy and charging rules function PCRF entity, a PCC rule includes:

formulating, by the PCRF, the PCC rule according to capability information of a UE, where the capability information of the UE indicates whether the UE supports data transmission both on the cellular access network and on the WLAN.

With reference to the first possible implementation manner of the fourth aspect, in a second possible implementation manner of the fourth aspect, the method further includes:

receiving, by the PCRF entity, the capability information that is of the UE and sent by the PCEF entity.

With reference to the fourth aspect, or the first possible implementation manner of the fourth aspect, or the second possible implementation manner of the fourth aspect, in a third possible implementation manner of the fourth aspect, the transmission characteristic identifier is at least one identifier of a radio access technology RAT selection priority identifier, an IP address preservation requirement identifier, and a traffic flow importance identifier; or the transmission characteristic identifier is used to identify a combination of at least one piece of information of RAT selection priority information, IP address preservation requirement information, and traffic flow importance information.

With reference to the fourth aspect, or the first possible implementation manner of the fourth aspect, or the second possible implementation manner of the fourth aspect, or the third possible implementation manner of the fourth aspect, in the fourth possible implementation manner of the fourth aspect, the sending, by the PCRF entity, the PCC rule to a policy and charging enforcement function PCEF entity includes:

sending, by the PCRF entity, the PCC rule to the PCEF entity according to a trigger condition for IP-connectivity access network IP-CAN session modification, where the trigger condition for the IP-CAN session modification includes at least one of the following: UE location change information, information about operator service usage of the UE, and traffic flow content information of the UE, and the information about operator service usage of the UE includes at least one of the following: package information, balance information, account change information, network load adjustment information, and UE subscription change information.

According to a fifth aspect, an embodiment of the present disclosure provides a UE, including:

a receiving unit, configured to receive indication information sent by an access node of a cellular access network, where the indication information includes a filtering condition, and the indication information is used to instruct the UE to transmit, by using a wireless local area network WLAN, a traffic flow that meets the filtering condition;

a determining unit, configured to determine, according to the indication information received by the receiving unit, that a first traffic flow meets the filtering condition; and a sending unit, configured to transmit, by using the WLAN, the first traffic flow, if the first traffic flow determined by the determining unit meets the filtering condition.

In a first possible implementation manner of the fifth aspect, the filtering condition includes a first identifier, where the first identifier includes at least one of a transmission characteristic identifier and a filter identifier, and the transmission characteristic identifier corresponds to the filter identifier; and the determining unit is specifically configured to determine, if the first traffic flow matches a first filter and filter information of the first filter includes the first identifier, that the first traffic flow meets the filtering condition.

With reference to the first possible implementation manner of the fifth aspect, in a second possible implementation manner of the fifth aspect, the filtering condition further includes a bearer identifier; and the determining unit is further configured to determine, according to the indication information received by the receiving unit, that the first filter is a filter of a bear corresponding to the bearer identifier.

With reference to the second possible implementation manner of the fifth aspect, in a third possible implementation manner of the fifth aspect, the filtering condition further includes a packet data network PDN connection identity or a PDN identity; and the determining unit is further configured to determine, according to the indication information received by the receiving unit, that the bearer corresponding to the bearer identifier is a bearer of a PDN connection corresponding to the PDN connection identity, or the bearer corresponding to the bearer identifier is a bearer of a PDN connection corresponding to the PDN identity.

With reference to the first possible implementation manner of the fifth aspect, in a fourth possible implementation manner of the fifth aspect, the filtering condition further includes a PDN connection identity or a PDN identity; and the determining unit is further configured to determine, according to the indication information received by the receiving unit, that the first filter is a filter of a filter of a PDN connection corresponding to the PDN connection identity, or determine, according to the indication information received by the receiving unit, that the first filter is a filter of a PDN connection corresponding to the PDN identity.

In a fifth possible implementation manner of the fifth aspect, the filtering condition includes a transmission characteristic identifier; and the determining unit is specifically configured to determine, if a transmission characteristic identifier of an application program corresponding to the first traffic flow is the transmission characteristic identifier, that the first traffic flow meets the filtering condition.

With reference to the first possible implementation manner of the fifth aspect, or the second possible implementation manner of the fifth aspect, or the third possible implementation manner of the fifth aspect, or the fourth possible implementation manner of the fifth aspect, or the fifth possible implementation manner of the fifth aspect, in a sixth possible implementation manner of the fifth aspect, the transmission characteristic identifier is at least one identifier of a radio access technology RAT selection priority identifier, an Internet Protocol IP address preservation requirement identifier, and a traffic flow importance identifier; or the transmission characteristic identifier is used to identify a combination of at least one piece of information of RAT selection priority information, IP address preservation requirement information, and traffic flow importance information.

With reference to any one possible implementation manner of the first to the sixth implementation manner of the fifth aspect, in a seventh possible implementation manner of the fifth aspect, the receiving unit is further configured to, before receiving the indication information sent by the access node of the cellular access network, receive a traffic flow template TFT sent by a policy and charging enforcement function PCEF entity, where the TFT includes filter information of a filter that matches the first traffic flow, and the filter information includes the transmission characteristic identifier.

In an eighth possible implementation manner of the fifth aspect, the filtering condition includes a bearer identifier; and the determining unit is specifically configured to determine, if the first traffic flow matches a first filter and the first filter is a filter of a bearer corresponding to the bearer identifier, that the first traffic flow meets the filtering condition.

With reference to the eighth possible implementation manner of the fifth aspect, in a ninth possible implementation manner of the fifth aspect, the filtering condition further includes a PDN connection identity or a PDN identity; and the determining unit is specifically configured to determine, according to the indication information received by the receiving unit, that the bearer corresponding to the bearer identifier is a bearer of a PDN connection corresponding to the PDN connection identity, or determine, according to the indication information received by the receiving unit, that the bearer corresponding to the bearer identifier is a bearer of a PDN connection corresponding to the PDN identity.

With reference to the fifth aspect, or any one possible implementation manner of the first to the ninth implementation manners of the fifth aspect, in a tenth possible implementation manner of the fifth aspect, the indication information further includes an indication indicating whether to preserve an IP address of the UE; and the indication information is further used to indicate whether to use, when the UE transmits the first traffic flow by using the WLAN, an IP address of the UE when the access node of the cellular access network transmits the first traffic flow.

With reference to the fifth aspect, or any one possible implementation manner of the first to the tenth implementation manners of the fifth aspect, in an eleventh possible implementation manner of the fifth aspect, the sending unit is further configured to, before the receiving unit receives the indication information sent by the access node of the cellular access network, send capability information of the UE to the access node of the cellular access network, where the capability information of the UE indicates whether the UE supports data transmission both on the cellular access network and on the WLAN.

With reference to the fifth aspect, or any one possible implementation manner of the first to the eleventh implementation manners of the fifth aspect, in a twelfth possible implementation manner of the fifth aspect, the sending unit is specifically configured to transmit, by using the WLAN, the first traffic flow to the PCEF entity, if the first traffic flow determined by the determining unit meets the filtering condition.

According to a sixth aspect, an embodiment of the present disclosure provides an access node of a cellular access network, including:

a determining unit, configured to determine indication information, where the indication information includes a filtering condition, and the indication information is used to instruct user equipment UE to transmit, by using a wireless local area network WLAN, a traffic flow that meets the filtering condition; and a sending unit, configured to send the indication information determined by the determining unit to the user equipment UE.

In a first possible implementation manner of the sixth aspect, the access node of the cellular access network further includes:

a receiving unit, configured to, before the determining unit determines the indication information, receive a first message sent by a policy and charging enforcement function PCEF entity, where the first message includes a transmission characteristic identifier, or includes the transmission characteristic identifier and a filter identifier corresponding to the transmission characteristic identifier, where the determining unit is further configured to determine, according to the transmission characteristic identifier received by the receiving unit, that a traffic flow that matches a filter corresponding to the transmission characteristic identifier is to be transmitted by using the WLAN, where the traffic flow that meets the filtering condition is the traffic flow that matches the filter corresponding to the transmission characteristic identifier.

With reference to the first possible implementation manner of the sixth aspect, in a second possible implementation manner of the sixth aspect, the filtering condition includes a first identifier, where the first identifier includes at least one of a transmission characteristic identifier and a filter identifier, and the transmission characteristic identifier corresponds to the filter identifier; and the traffic flow that meets the filtering condition includes:

a first traffic flow, where the first traffic flow matches a first filter and filter information of the first filter includes the first identifier.

With reference to the second possible implementation manner of the sixth aspect, in a third possible implementation manner of the sixth aspect, the filtering condition further includes a bearer identifier, where the first filter is a filter of a bearer corresponding to the bearer identifier.

With reference to the third possible implementation manner of the sixth aspect, in a fourth possible implementation manner of the sixth aspect, the filtering condition further includes a packet data network PDN connection identity or a PDN identity, where the bearer corresponding to the bearer identifier is a bearer of a PDN connection corresponding to the PDN connection identity, or the bearer corresponding to the bearer identifier is a bearer of a PDN connection corresponding to the PDN identity.

With reference to the second possible implementation manner of the sixth aspect, in a fifth possible implementation manner of the sixth aspect, the filtering condition further includes a PDN connection identity or a PDN identity, where the first filter is a filter of a PDN connection corresponding to the PDN connection identity, or the first filter is a filter of a PDN connection corresponding to the PDN identity.

With reference to the first possible implementation manner of the sixth aspect, in a sixth possible implementation manner of the sixth aspect, the filtering condition includes the transmission characteristic identifier; and the traffic flow that meets the filtering condition includes a first traffic flow, where a transmission characteristic identifier of an application program corresponding to the first traffic flow is the transmission characteristic identifier.

With reference to any one possible implementation manner of the first to the sixth implementation manners of the sixth aspect, in a seventh possible implementation manner of the sixth aspect, the transmission characteristic identifier is at least one identifier of a radio access technology RAT selection priority identifier, an IP address preservation requirement identifier, and a traffic flow importance identifier; or the transmission characteristic identifier is used to identify a combination of at least one piece of information of RAT selection priority information, IP address preservation requirement information, and traffic flow importance information.

With reference to the first possible implementation manner of the sixth aspect, in an eighth possible implementation manner of the sixth aspect, the filtering condition further includes a bearer identifier; and the traffic flow that meets the filtering condition includes a first traffic flow, where the first traffic flow matches a first filter and the first filter is a filter of a bearer corresponding to the bearer identifier.

With reference to the eighth possible implementation manner of the sixth aspect, in a ninth possible implementation manner of the sixth aspect, the filtering condition further includes a PDN connection identity or a PDN identity; and the bearer corresponding to the bearer identifier is a bearer of a PDN connection corresponding to the PDN connection identity, or the bearer corresponding to the bearer identifier is a bearer of a PDN connection corresponding to the PDN identity.

With reference to the sixth aspect, or any one possible implementation manner of the first to the ninth implementation manners of the sixth aspect, in a tenth possible implementation manner of the sixth aspect, the indication information further includes an indication indicating whether to preserve an IP address of the UE; and the indication information is further used to indicate whether to use, when the UE transmits the first traffic flow by using the WLAN, an IP address of the UE when the access node of the cellular access network transmits the first traffic flow.

With reference to any one possible implementation manner of the first to the tenth implementation manners of the sixth aspect, in an eleventh possible implementation manner of the sixth aspect, the determining unit is specifically configured to determine, according to the transmission characteristic identifier and a combination of one or more types of the following information: a load status of the cellular access network, a load status of the WLAN, capability information of the UE, and a network connection state of the UE, that the traffic flow that matches the filter corresponding to the transmission characteristic identifier is to be transmitted by using the WLAN, where the capability information of the UE indicates whether the UE supports data transmission both on the cellular access network and on the WLAN, and the network connection state is whether the UE has accessed the WLAN.

With reference to the eleventh possible implementation manner of the sixth aspect, in a twelfth possible implementation manner of the sixth aspect, the receiving unit is further configured to, before the determining unit determines the indication information, receive capability information that is of the UE and is sent by the UE.

With reference to any one possible implementation manner of the first to the tenth implementation manners of the sixth aspect, in a thirteenth possible implementation manner of the sixth aspect, the determining unit is specifically configured to receive a second traffic flow sent by the PCEF entity, where the second traffic flow carries the transmission characteristic identifier, and the transmission characteristic identifier corresponds to a filter that matches the second traffic flow; and separately collect, during a preset time, statistics about a combination of one or more types of the following information of the second traffic flow: traffic of the second traffic flow, a proportion of the traffic of the second traffic flow in traffic of all downlink traffic flows of the UE, a proportion of the traffic of the second traffic flow in traffic of a bearer that bears the second traffic flow, and a proportion of the traffic of the second traffic flow in traffic of a packet data network PDN connection by using which the second traffic flow is transmitted; and determine, according to the statistics collected about the combination of one or more types of the information of the second traffic flow, that the traffic flow that matches the filter corresponding to the transmission characteristic identifier is to be transmitted by using the WLAN.

With reference to the thirteenth possible implementation manner of the sixth aspect, in a fourteenth possible implementation manner of the sixth aspect, a differentiated services code point DSCP in an Internet Protocol IP header of a data packet of the second traffic flow carries the transmission characteristic identifier, or a header of a GPRS Tunneling Protocol for the user plane GTP-U packet that bears a data packet of the second traffic flow carries the transmission characteristic identifier.

With reference to any one possible implementation manner of the first to the fourteenth implementation manners of the sixth aspect, in a fifteenth possible implementation manner of the sixth aspect, the sending unit is further configured to send downlink indication information to the PCEF entity, where the downlink indication information instruct the PCEF entity to transmit, by using the WLAN, the traffic flow that matches the filter corresponding to the transmission characteristic identifier.

With reference to the fifteenth possible implementation manner of the sixth aspect, in a sixteenth possible implementation manner of the sixth aspect, the downlink indication information further includes the PDN connection identity or the PDN identity, where the traffic flow that matches the filter corresponding to the transmission characteristic identifier is a traffic flow of the PDN connection corresponding to the PDN connection identity, or the traffic flow that matches the filter corresponding to the transmission characteristic identifier is a traffic flow of the PDN connection corresponding to the PDN identity.

According to a seventh aspect, an embodiment of the present disclosure provides a PCEF entity, including:

a receiving unit, configured to receive a transmission characteristic identifier sent by a policy and charging rules function PCRF entity; and a sending unit, configured to send a first message to an access node of a cellular access network according to the transmission characteristic identifier received by the receiving unit, where the first message includes the transmission characteristic identifier, or includes the transmission characteristic identifier and a filter identifier corresponding to the transmission characteristic identifier, and the transmission characteristic identifier is used to instruct the access node of the cellular access network to determine whether a traffic flow that matches a filter corresponding to the transmission characteristic identifier is to be transmitted by using a wireless local area network WLAN.

In a first possible implementation manner of the seventh aspect, the receiving unit is specifically configured to receive a policy control and charging PCC rule sent by the PCRF entity, where the PCC rule includes the filter corresponding to the transmission characteristic identifier, filter information of the filter, and quality of service QoS information corresponding to the filter, and the filter information of the filter includes the transmission characteristic identifier.

With reference to the first possible implementation manner of the seventh aspect, in a second possible implementation manner of the seventh aspect, the PCEF entity further includes:

a determining unit, configured to determine, according to the QoS information received by the receiving unit, a bearer that transmits the traffic flow that matches the filter; and an adding unit, configured to add the filter and the filter information of the filter that are received by the receiving unit to a traffic flow template TFT corresponding to the bearer determined by the determining unit; where the sending unit is further configured to send the TFT to a UE.

With reference to the first possible implementation manner of the seventh aspect, in a third possible implementation manner of the seventh aspect, the PCEF entity further includes:

a determining unit, configured to determine, according to the transmission characteristic identifier received by the receiving unit, a bearer that transmits the traffic flow that matches the filter; and an adding unit, configured to add the filter received by the receiving unit to a TFT corresponding to the bearer determined by the determining unit; where the sending unit is further configured to send the TFT to a UE.

With reference to the seventh aspect, or the first possible implementation manner of the seventh aspect, or the second possible implementation manner of the seventh aspect, or the third possible implementation manner of the seventh aspect, in a fourth possible implementation manner of the seventh aspect, the transmission characteristic identifier is at least one identifier of a radio access technology RAT selection priority identifier, an IP address preservation requirement identifier, and a traffic flow importance identifier; or the transmission characteristic identifier is used to identify a combination of at least one piece of information of RAT selection priority information, IP address preservation requirement information, and traffic flow importance information.

With reference to the seventh aspect, or the first possible implementation manner of the seventh aspect, or the second possible implementation manner of the seventh aspect, or the third possible implementation manner of the seventh aspect, or the fourth possible implementation manner of the seventh aspect, in a fifth possible implementation manner of the seventh aspect, the receiving unit is further configured to receive capability information that is of the UE and is sent by the access node of the cellular access network, where the capability information of the UE indicates whether the UE supports data transmission both on the cellular access network and on the WLAN.

With reference to the fifth possible implementation manner of the seventh aspect, in a sixth possible implementation manner of the seventh aspect, the sending unit is further configured to send the capability information that is of the UE and is received by the receiving unit to the PCRF entity, so that the PCRF entity formulates the PCC rule according to a capability of the UE.

With reference to the seventh aspect, or any one possible implementation manner of the first to the sixth implementation manners of the seventh aspect, in a seventh possible implementation manner of the seventh aspect, the sending unit is further configured to, when the capability information of the UE indicates that the UE supports data transmission both on the cellular access network and on the WLAN, determine to send a third traffic flow to the UE by using the WLAN, where the third traffic flow is the traffic flow that matches the filter corresponding to the transmission characteristic identifier.

With reference to the seventh possible implementation manner of the seventh aspect, in an eighth possible implementation manner of the seventh aspect, the sending unit is specifically configured to determine, according to a first traffic flow that is sent by the UE and is received by using the WLAN, to transmit the third traffic flow by using the WLAN to the UE, where the first traffic flow is the traffic flow that matches the filter corresponding to the transmission characteristic identifier.

With reference to the seventh possible implementation manner of the seventh aspect, in a ninth possible implementation manner of the seventh aspect, the sending unit is specifically configured to determine, according to a preset policy, to send the third traffic flow to the UE by using the WLAN.

With reference to the seventh possible implementation manner of the seventh aspect, in a tenth possible implementation manner of the seventh aspect, the sending unit is specifically configured to determine, according to downlink indication information sent by the access node of the cellular access network, to send the third traffic flow to the UE by using the WLAN, where the downlink indication information is used to instruct the PCEF entity to transmit, by using the WLAN, the traffic flow that matches the filter corresponding to the transmission characteristic identifier.

With reference to the tenth possible implementation manner of the seventh aspect, in an eleventh possible implementation manner of the seventh aspect, the downlink indication information further includes a PDN connection identity or a PDN identity, where the traffic flow that matches the filter corresponding to the transmission characteristic identifier is a traffic flow of a PDN connection corresponding to the PDN connection identity, or the traffic flow that matches the filter corresponding to the transmission characteristic identifier is a traffic flow of a PDN connection corresponding to the PDN identity.

According to an eighth aspect, an embodiment of the present disclosure provides a PCRF entity, including:

a processing unit, configured to formulate a policy control and charging PCC rule; and a sending unit, configured to send the PCC rule formulated by the processing unit to a policy and charging enforcement function PCEF entity, where the PCC rule includes a transmission characteristic identifier, and the transmission characteristic identifier is used to instruct an access node of a cellular access network to determine whether a traffic flow that matches a filter corresponding to the transmission characteristic identifier is to be transmitted by using a wireless local area network WLAN.

In a first possible implementation manner of the eighth aspect, the processing unit is specifically configured to formulate the PCC rule according to capability information of a UE, where the capability information of the UE indicates that the UE supports data transmission both on the cellular access network and on the WLAN.

With reference to the first possible implementation manner of the eighth aspect, in a second possible implementation manner of the eighth aspect, the PCRF entity further includes:

a receiving unit, configured to, before the processing unit formulates the PCC rule according to the capability information of the UE, receive the capability information that is of the UE and is sent by the PCEF entity.

With reference to the eighth aspect, or the first possible implementation manner of the eighth aspect, or the second possible implementation manner of the eighth aspect, in a third possible implementation manner of the eighth aspect, the transmission characteristic identifier is at least one identifier of a radio access technology RAT selection priority identifier, an IP address preservation requirement identifier, and a traffic flow importance identifier; or the transmission characteristic identifier is used to identify a combination of at least one piece of information of RAT selection priority information, IP address preservation requirement information, and traffic flow importance information.

With reference to the eighth aspect, or the first possible implementation manner of the eighth aspect, or the second possible implementation manner of the eighth aspect, or the third possible implementation manner of the eighth aspect, in a fourth possible implementation manner of the eighth aspect, the sending unit is specifically configured to send, according to a trigger condition for IP-connectivity access network IP-CAN session modification, the PCC rule formulated by the processing unit to the PCEF entity, where the trigger condition for the IP-CAN session modification includes at least one of the following: UE location change information, information about operator service usage of the UE, and traffic flow content information of the UE, and the information about operator service usage of the UE includes at least one of the following: package information, balance information, account change information, network load adjustment information, and UE subscription change information.

According to the data transmission method and the apparatus provided in the embodiments of the present disclosure, a UE receives indication information sent by an access node of a cellular access network, where the indication information includes a filtering condition, and the indication information is used to instruct the UE to transmit, by using a WLAN, a traffic flow that meets the filtering condition; then, the UE determines, according to the indication information, that a first traffic flow meets the filtering condition; and transmits the first traffic flow by using the WLAN. Therefore, according to an indication of the access node of the cellular access network, the UE may choose to transmit the traffic flow by using the WLAN, so that the UE completes WLAN route selection for the traffic flow and matching of a cellular access network transmission bearer at a time, which is simple in implementation; in addition, when an access device of the cellular access network sends indication information, a real-time status of the cellular access network and the WLAN network and a characteristic of the traffic flow are considered, thereby improving data transmission efficiency.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show some embodiments of the present disclosure, and a person of ordinary skill in the art may still derive other drawings from these accompanying drawings without creative efforts.

DESCRIPTION OF EMBODIMENTS

To make the objectives, technical solutions, and advantages of the embodiments of the present disclosure clearer, the following clearly describes the technical solutions in the embodiments of the present disclosure with reference to the accompanying drawings in the embodiments of the present disclosure. Apparently, the described embodiments are some but not all of the embodiments of the present disclosure. All other embodiments obtained by a person of ordinary skill in the art based on the embodiments of the present disclosure without creative efforts shall fall within the protection scope of the present disclosure.

In the embodiments of the present disclosure, a device of a cellular access network may be an evolved NodeB (eNB), a NodeB (NB) and a radio network controller (RNC), a base transceiver station (BTS) and a base station controller (BSC), a single radio controller (SRC, which is an access network device integrated with a multi-standard radio network controller or coordinator); the cellular access network includes a network of an access technology type such as Long Term Evolution (LTE), Universal Mobile Telecommunications System (UMTS), Code Division Multiple Access (CDMA) 2000 or Global System for Mobile Communications (GSM), or CDMA2000 1×. LTE belongs to a $4^{th}$ generation mobile communications (4G) technology; UMTS and CDMA2000 belong to a $3^{rd}$ generation mobile communications (3G) technology; GSM and CDMA2000 1× belong to a $2^{nd}$ generation mobile communications (2G) technology. An access node of the cellular access network includes: a single radio controller (SRC), an eNB in LTE, an RNC and a Node Base (NodeB) in 3G a BSC and a BTS in 2G and the like.

Figure 1:
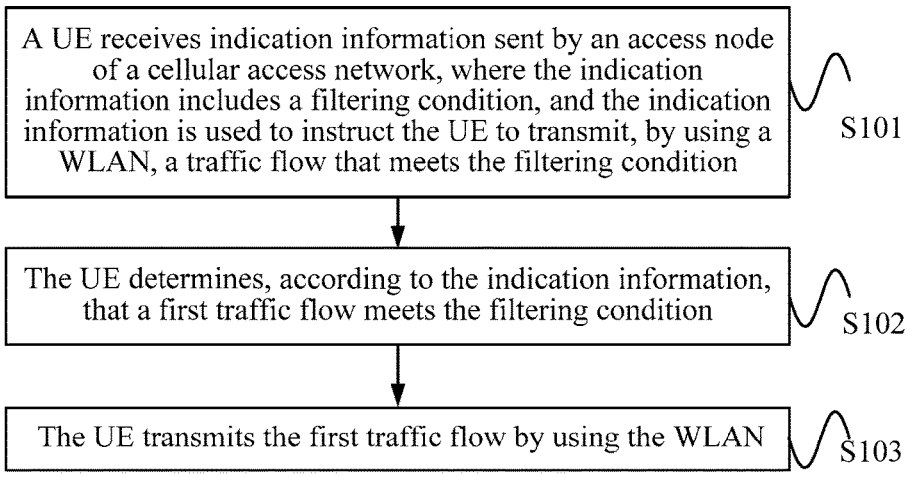
FIG. 1 is a flowchart of a data transmission method according to an embodiment of the present disclosure.

FIG. 1 is a flowchart of a data transmission method according to an embodiment of the present disclosure. As shown in FIG. 1, the method in this embodiment may include:

S101. A UE receives indication information sent by an access node of a cellular access network, where the indication information includes a filtering condition, and the indication information is used to instruct the UE to transmit, by using a WLAN, a traffic flow that meets the filtering condition.

In this embodiment, the UE may receive the indication information sent by the access node of the cellular access network. The access node of the cellular access network can determine which traffic flow to be sent by the UE may be transmitted by using the WLAN. In this embodiment, the access node of the cellular access network may determine that at least one traffic flow to be sent by the UE is transmitted by using the WLAN, and these traffic flows transmitted by using the WLAN meet a specific filtering condition. Then, the access node of the cellular access network sends the indication information to the UE, where the indication information includes the filtering condition, and the indication information is used to instruct the UE to transmit, by using the WLAN, the traffic flow that meets the filtering condition. A traffic flow sent by the UE may be referred to as an uplink traffic flow, while a traffic flow received by the UE may be referred to as a downlink traffic flow. Specifically, in a process of interaction between the access node of the cellular access network and the UE, the indication information may be an RRC message, a user plane message, or the like, which is not limited in this embodiment of the present disclosure.

S102. The UE determines, according to the indication information, that a first traffic flow meets the filtering condition.

In this embodiment, the indication information received by the UE may be used to instruct the UE to transmit, by using the WLAN, the traffic flow that meets the filtering condition. The UE can determine which traffic flows to be sent by the UE meet the filtering condition, and a traffic flow that meets the filtering condition may be referred to as a first traffic flow.

S103. The UE transmits the first traffic flow by using the WLAN.

In this embodiment, after determining the first traffic flow that meets the filtering condition, the UE may transmit the first traffic flow by using the WLAN, for example, the UE may send the first traffic flow to a packet data network (PDN) by using the WLAN.

In this embodiment, the UE may determine, according to the indication information, the first traffic flow that meets the filtering condition, and then transmits the determined first traffic flow not by using the cellular access network (that is, the first traffic flow is not sent to the access node of the cellular access network), but by using the WLAN, for example, sends the first traffic flow to the PDN. Therefore, the UE can transmit a traffic flow by using the WLAN. Specifically, in a first feasible implementation manner, the UE may send, by using the WLAN, the first traffic flow to a core network gateway device, that is, a policy and charging enforcement function (PCEF) entity, where the PCEF entity may be a packet data network gateway (PGW) or a gateway GPRS support node (GGSN). Then, the PCEF entity sends the first traffic flow to the PDN. In a second feasible implementation manner, the UE may send the first traffic flow to a fixed network device by using the WLAN, and then the fixed network device sends the first traffic flow to the PDN. In a third feasible implementation manner, the UE may send one part of traffic flow the first traffic flow to a PCEF entity by using the WLAN, and then the PCEF entity sends this part of the uplink traffic flow to the PDN. The UE may further send the other part of traffic flow the first traffic flow to a fixed network device, and then, the fixed network device sends the other part of the uplink traffic flow to the PDN. The indication information may further include an indication indicating whether to preserve an Internet Protocol (IP) address of the UE. The indication information is further used to indicate whether to use, when the UE uses the WLAN to transmit a traffic flow indicated by the transmission characteristic identifier, an IP address of the UE when the access node of the cellular access network transmits the traffic flow. If the indication information instructs to use the IP address of the UE when the access node of the cellular access network transmits the traffic flow, after accessing the WLAN, the UE needs to instruct to establish, in the network, a PDN connection to a PCEF entity (for example, a PGW) that is connected when the UE transmits the traffic flow from the original access node of the cellular access network. It should be noted that the IP address of the UE is a source IP address of the traffic flow sent by the UE.

Figure 2:
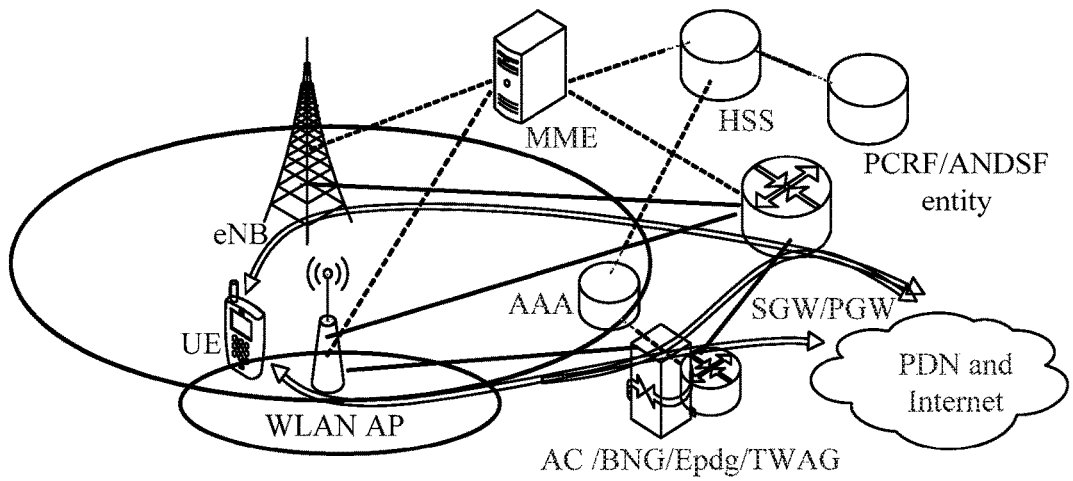
FIG. 2 is a schematic diagram of an application scenario of a data transmission method according to an embodiment of the present disclosure.

The following uses an example to describe a manner in which a UE transmits data to a PDN. FIG. 2 is a schematic diagram of an application scenario of a data transmission method according to an embodiment of the present disclosure. As shown in FIG. 2, the application scenario in this embodiment is an LTE network scenario, which includes: a UE, an eNB, a WLAN access point (AP), a mobility management entity (MME), Authentication Authorization Accounting (AAA), a home subscriber server (HSS), a policy and charging rules function (PCRF)/ANDSF entity, a serving gateway (SGW)/PGW, an access controller (AC)/broadband network gateway (BNG)/evolved packet data gateway (ePDG)/trusted WLAN access gateway (TWAG), the PDN, and the Internet. In this application scenario, the UE may send a traffic flow to the PDN by using a cellular access network, as shown in FIG. 2, that is, the UE may transmit a traffic flow to the eNB; the eNB may transmit the traffic flow to the SGW/PGW; then, the SGW/PGW transmits the traffic flow to the PDN. Alternatively, the UE may transmit a traffic flow to the PDN by using a WLAN, as shown in FIG. 2, that is, the UE may transmit a traffic flow to the WLAN AP; the WLAN AP transmits the traffic flow to the AC/BNG/ePDG/TWAG; then, the AC/BNG/ePDG/TWAG transmits the traffic flow directly to the PDN, or the AC/BNG/ePDG/TWAG transmits the traffic flow to the SGW/PGW, and then the SGW/PGW transmits the traffic flow to the PDN. In this application scenario, an offloading point of traffic flow transmission between the UE and the PDN separately by using the cellular access network and the WLAN is located in the SGW/PGW. It should be noted that "/" that appears in the foregoing or the following represents "or".

Figure 3:
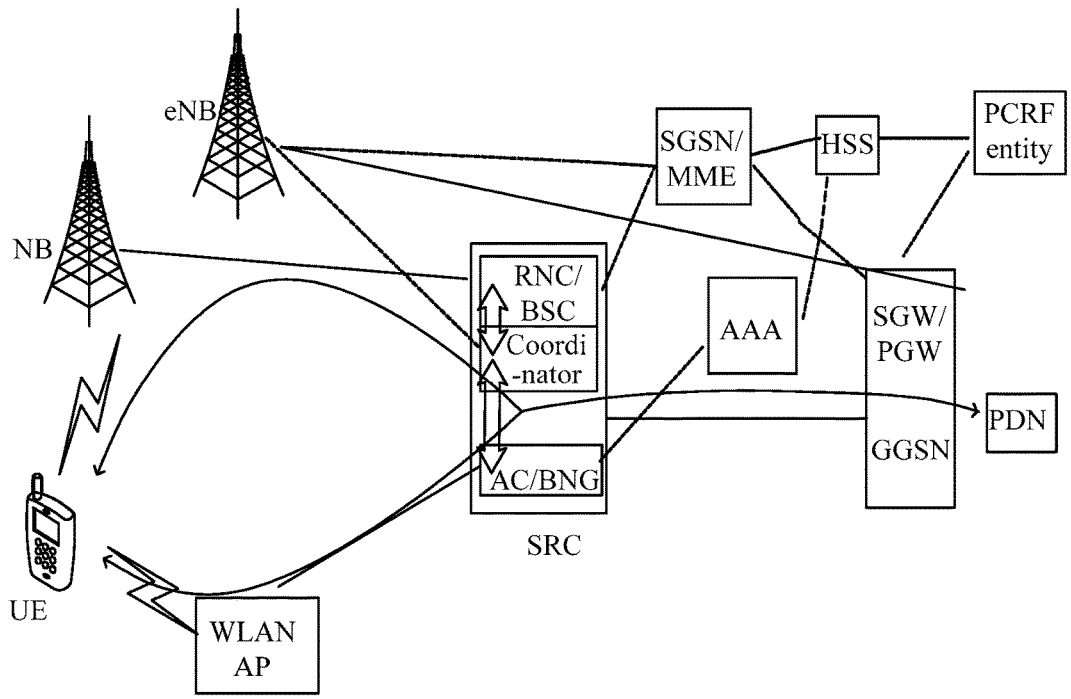
FIG. 3 is a schematic diagram of an application scenario of a data transmission method according to an embodiment of the present disclosure.

The following uses an example to describe that an offloading point of traffic flow transmission between the UE and the PDN separately by using the cellular access network and the WLAN is located in the cellular access network. FIG. 3 is a schematic diagram of an application scenario of a data transmission method according to an embodiment of the present disclosure. As shown in FIG. 3, the application scenario in this embodiment includes: a UE, an NB, an eNB, a WLAN AP, an SRC, an SGSN/MME, AAA, a serving GPRS support node (SGSN), an HSS, an SGW/PGW/GGSN, and a PCRF entity, and a PDN, where the SRC includes: an RNC/BSC, a coordinator, and an AC/BNG In this application scenario, the UE and the PDN separately access a network by using the cellular access network. That is, as shown in FIG. 3, a user plane of the WLAN network accesses the cellular access network and is used as an air interface transmission resource of the cellular access network, and the WLAN and the cellular access network share the S12/S1-U/Gn interface between the cellular access network and a cellular core network. The UE may send a traffic flow to the SRC by using the cellular access network; the SRC sends the traffic flow to the SGW/PGW/GGSN; then, the SGW/PGW/GGSN sends the traffic flow to the PDN. The UE may send a traffic flow to the SRC by using the WLAN; the SRC sends the traffic flow to the SGW/PGW/GGSN; then, the SGW/PGW/GGSN sends the traffic flow to the PDN.

It should be noted that the application scenario shown in the foregoing FIG. 2 or FIG. 3 is not only applicable to the data transmission method in this embodiment of the present disclosure, but may also be applicable to the data transmission methods provided in the following embodiments of the present disclosure.

According to the data transmission method provided in this embodiment of the present disclosure, a UE receives indication information sent by an access node of a cellular access network, where the indication information includes a filtering condition, and the indication information is used to instruct the UE to transmit, by using a WLAN, a traffic flow that meets the filtering condition; Then, the UE determines, according to the indication information, that a first traffic flow meets the filtering condition, and transmits the first traffic flow by using the WLAN. Therefore, according to an indication of the access node of the cellular access network, the UE may choose to transmit the traffic flow by using the WLAN, so that the UE completes WLAN route selection for the traffic flow and matching of a cellular access network transmission bearer at a time, which is simple in implementation; in addition, when an access device of the cellular access network sends indication information, a real-time status of the cellular access network and the WLAN network and a characteristic of the traffic flow are considered, thereby improving data transmission efficiency.

Figure 4:
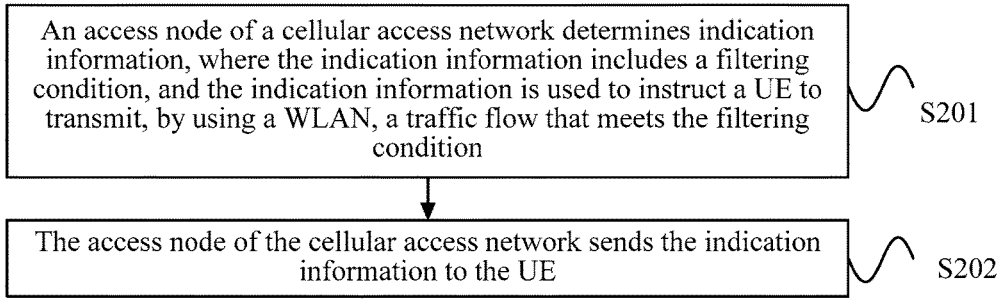
FIG. 4 is a flowchart of a data transmission method according to an embodiment of the present disclosure.

FIG. 4 is a flowchart of a data transmission method according to an embodiment of the present disclosure. As shown in FIG. 4, the method in this embodiment may include:

S201. An access node of a cellular access network determines indication information, where the indication information includes a filtering condition, and the indication information is used to instruct a UE to transmit, by using a WLAN, a traffic flow that meets the filtering condition.

In this embodiment, a device of the cellular access network may be an eNB in LTE, a NodeB and an RNC in UMTS, a BTS and a BSC in GSM, or an SRC (an access network device integrated with a multi-standard radio network controller or coordinator). The access node of the cellular access network may receive a transmission characteristic identifier. Specifically, the access node of the cellular access network can determine which traffic flow to be sent by the UE may be transmitted by using the WLAN, so that it can be determined that the traffic flow to be transmitted by using the WLAN meets the filtering condition. Therefore, the access node of the cellular access network can determine the indication information, where the indication information includes the filtering condition, and the indication information is used to instruct the UE to transmit, by using the WLAN, the traffic flow that meets the filtering condition.

S202. The access node of the cellular access network sends the indication information to the UE.

In this embodiment, after determining that the traffic flow meets a specific filtering condition and needs to be transmitted by using the WLAN, and determining the indication information, the access node of the cellular access network sends the indication information to the UE, so as to instruct the UE to transmit, by using the WLAN, the traffic flow that meets the filtering condition. A traffic flow sent by the UE may be referred to as an uplink traffic flow, while a traffic flow received by the UE may be referred to as a downlink traffic flow. Specifically, in a process of interaction between the access node of the cellular access network and the UE, the indication information may be an RRC message, a user plane message, or the like, which is not limited in this embodiment of the present disclosure. The UE may determine, according to the indication information, that a first traffic flow meets the filtering condition in the indication information, and then transmits the first traffic flow by using the WLAN, that is, the first traffic flow is not transmitted by using the cellular access network (that is, the first traffic flow is not sent to the access node of the cellular access network), but is sent to a PDN by using the WLAN instead. Therefore, the UE can transmit the traffic flow by using the WLAN. The indication information may further include an indication indicating whether to preserve an IP address of the UE. The indication information is further used to indicate whether to use, when the UE uses the WLAN to transmit a traffic flow indicated by the transmission characteristic identifier, an IP address of the UE when the access node of the cellular access network transmits the traffic flow.

According to the data transmission method provided in this embodiment of the present disclosure, an access node of a cellular access network determines indication information, where the indication information includes a filtering condition, and the indication information is used to instruct a UE to transmit, by using a WLAN, a traffic flow that meets the filtering condition; and then sends the indication information to the UE. Therefore, according to an indication of the access node of the cellular access network, the UE may choose to transmit an uplink traffic flow by using the WLAN, so that the UE completes WLAN route selection for the traffic flow and matching of a cellular access network transmission bearer at a time, which is simple in implementation; in addition, when an access device of the cellular access network sends indication information, a real-time status of the cellular access network and the WLAN network and a characteristic of the traffic flow are considered, thereby improving data transmission efficiency.

Figure 5:
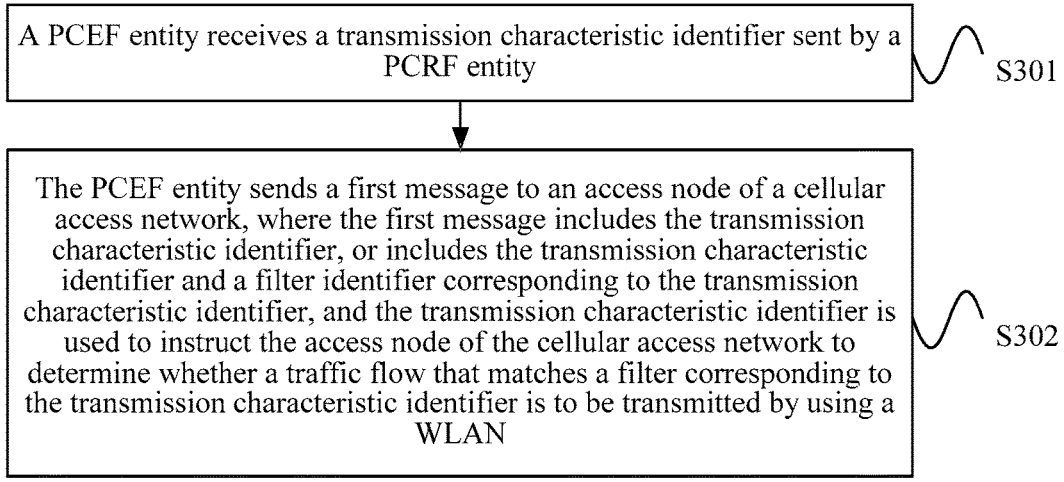
FIG. 5 is a flowchart of a data transmission method according to an embodiment of the present disclosure.

FIG. 5 is a flowchart of a data transmission method according to an embodiment of the present disclosure. As shown in FIG. 5, the method in this embodiment may include:

S301. A PCEF entity receives a transmission characteristic identifier sent by a PCRF entity.

In this embodiment, the PCEF entity may receive the transmission characteristic identifier sent by the PCRF entity, where the transmission characteristic identifier may indicate a type of a traffic flow, or may indicate a filter that matches the traffic flow.

S302. The PCEF entity sends a first message to an access node of a cellular access network, where the first message includes the transmission characteristic identifier, or includes the transmission characteristic identifier and a filter identifier corresponding to the transmission characteristic identifier, and the transmission characteristic identifier is used to instruct the access node of the cellular access network to determine whether a traffic flow that matches a filter corresponding to the transmission characteristic identifier is to be transmitted by using a WLAN.

In this embodiment, the PCEF entity may be a PGW or a GGSN. After receiving the transmission characteristic identifier sent by the PCRF entity, the PCEF entity sends the transmission characteristic identifier to the access node of the cellular access network, that is, includes the transmission characteristic identifier into the first message and sends the first message to the access node of the cellular access network, where the transmission characteristic identifier instructs the access node of the cellular access network to determine whether the traffic flow that matches the filter corresponding to the transmission characteristic identifier is to be transmitted by using the WLAN; or, the PCEF entity determines, according to the transmission characteristic identifier, the filter identifier corresponding to the transmission characteristic identifier, and then sends the filter identifier to the access node of the cellular access network, that is, includes the filter identifier into the first message and sends the first message to the access node of the cellular access network. Each filter has a filter identifier, and there is a one-to-one correspondence between a filter identifier and a filter, that is, one filter identifier corresponds to one filter. The filter is used to match a traffic flow, that is, the filter is used to filter and obtain a traffic flow that matches the filter, and therefore, a traffic flow described by the filter may be determined according to the filter identifier. Then, after receiving the first message, the access node of the cellular access network determines, according to the first message, the traffic flow that matches the filter corresponding to the transmission characteristic identifier and is transmitted by using the WLAN, and then determines indication information and sends the indication information to the UE, where the indication information includes a filtering condition; the indication information is used to instruct the UE to transmit a traffic flow that meets the filtering condition; the traffic flow that meets the filtering condition is the traffic flow that matches the filter corresponding to the transmission characteristic identifier. The UE may determine, according to the indication information, that a first traffic flow meets the filtering condition, and then transmits the first traffic flow by using the WLAN, that is, the first traffic flow is not transmitted by using the cellular access network (that is, the first traffic flow is not sent to the access node of the cellular access network), but is sent to a PDN by using the WLAN instead. Therefore, the UE can transmit a traffic flow by using the WLAN. The access node of the cellular access network may be an eNB in LTE, a NodeB and an RNC in UMTS, a BTS and a BSC in GSM, or an SRC, an access network device integrated with a multi-standard radio network controller or coordinator. The indication information may further include an indication indicating whether to preserve an IP address of the UE. The indication information is further used to indicate whether to use, when the UE uses the WLAN to transmit a traffic flow indicated by the transmission characteristic identifier, an IP address of the UE when the access node of the cellular access network transmits the traffic flow.

According to the data transmission method provided in this embodiment of the present disclosure, a PCEF entity receives a transmission characteristic identifier sent by a PCRF entity, and the PCEF entity sends a first message to an access node of a cellular access network, where the first message includes the transmission characteristic identifier, or includes the transmission characteristic identifier and a filter identifier corresponding to the transmission characteristic identifier, and the transmission characteristic identifier is used to instruct the access node of the cellular access network to determine whether a traffic flow that matches a filter corresponding to the transmission characteristic identifier is to be transmitted by using a WLAN. Therefore, according to an indication of the access node of the cellular access network, the UE may choose to transmit an uplink traffic flow by using the WLAN, so that the UE completes WLAN route selection for the traffic flow and matching of a cellular access network transmission bearer at a time, which is simple in implementation; in addition, when an access device of the cellular access network sends indication information, a real-time status of the cellular access network and the WLAN network and a characteristic of the traffic flow are considered, thereby improving data transmission efficiency.

Figure 6:
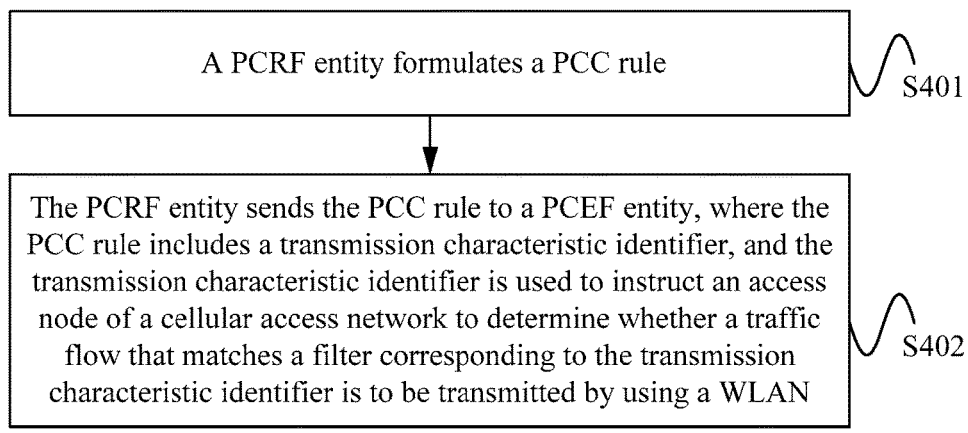
FIG. 6 is a flowchart of a data transmission method according to an embodiment of the present disclosure.

FIG. 6 is a flowchart of a data transmission method according to an embodiment of the present disclosure. As shown in FIG. 6, the method in this embodiment may include:

S401. A PCRF entity formulates a policy control and charging (PCC) rule.

S402. The PCRF entity sends the PCC rule to a PCEF entity, where the PCC rule includes a transmission characteristic identifier, and the transmission characteristic identifier is used to instruct an access node of a cellular access network to determine whether a traffic flow that matches a filter corresponding to the transmission characteristic identifier is to be transmitted by using a WLAN.

In this embodiment, the PCRF entity may formulate the PCC rule, and then send the PCC rule to the PCEF entity, where the PCC rule includes the transmission characteristic identifier, and the transmission characteristic identifier is used to instruct the access node of the cellular access network to determine whether the traffic flow that matches the filter corresponding to the transmission characteristic identifier is to be transmitted by using the WLAN. Specifically, the PCC rule includes the filter corresponding to the transmission characteristic identifier, filter information of the filter, and quality of service QoS information corresponding to the filter, and the filter information of the filter includes the transmission characteristic identifier.

The PCEF entity receives the transmission characteristic identifier sent by the PCRF entity, and then sends a first message to the access node of the cellular access network, where the first message includes the transmission characteristic identifier, or includes the transmission characteristic identifier and a filter identifier corresponding to the transmission characteristic identifier. The access node of the cellular access network receives the first message sent by the PCEF entity, determines indication information, and then sends the indication information to a UE, where the indication information includes a filtering condition; the indication information is used to instruct the UE to transmit a traffic flow that meets the filtering condition by using the WLAN; the traffic flow that meets the filtering condition is the traffic flow that matches the filter corresponding to the transmission characteristic identifier. The UE receives the indication information sent by the access node of the cellular access network, where the indication information is used to instruct the UE to transmit, by using the WLAN, the traffic flow that meets the filtering condition; then, according to the indication information, the UE determines that a first traffic flow meets the filtering condition, and transmits the first traffic flow by using the WLAN. The indication information may further include an indication indicating whether to preserve an IP address of the UE. The indication information is further used to indicate whether to use, when the UE uses the WLAN to transmit a traffic flow indicated by the transmission characteristic identifier, an IP address of the UE when the access node of the cellular access network transmits the traffic flow.

According to the data transmission method provided in this embodiment of the present disclosure, a PCRF entity formulates a PCC rule, and then sends the PCC rule to a PCEF entity, where the PCC rule includes a transmission characteristic identifier, and the transmission characteristic identifier is used to instruct an access node of a cellular access network to determine whether a traffic flow that matches a filter corresponding to the transmission characteristic identifier is to be transmitted by using a WLAN. Therefore, according to an indication of the access node of the cellular access network, the UE may choose to transmit an uplink traffic flow by using the WLAN, so that the UE completes WLAN route selection for the traffic flow and matching of a cellular access network transmission bearer at a time, which is simple in implementation; in addition, when an access device of the cellular access network sends indication information, a real-time status of the cellular access network and the WLAN network and a characteristic of the traffic flow are considered, thereby improving data transmission efficiency.

Figure 7:
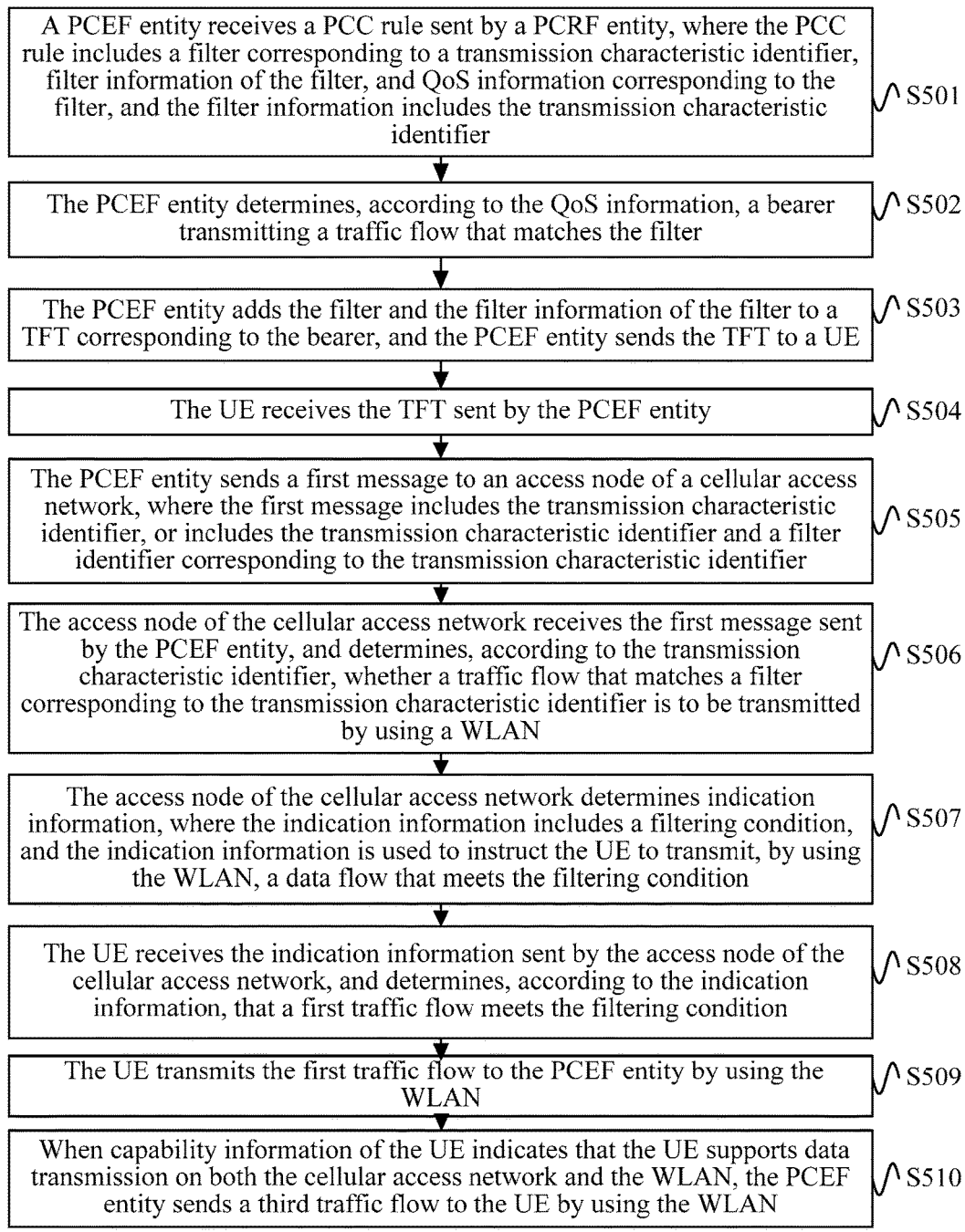
FIG. 7 is a flowchart of a data transmission method according to an embodiment of the present disclosure.

FIG. 7 is a flowchart of a data transmission method according to an embodiment of the present disclosure. As shown in FIG. 7, the method in this embodiment may include:

S501. A PCEF entity receives a PCC rule sent by a PCRF entity, where the PCC rule includes a filter corresponding to a transmission characteristic identifier, filter information of the filter, and quality of service (QoS) information corresponding to the filter, and the filter information includes the transmission characteristic identifier.

In this embodiment, the PCEF entity may receive the PCC rule sent by the PCRF entity, where the PCC rule includes: the filter corresponding to the transmission characteristic identifier, the filter information of the filter, and the QoS information corresponding to the filter, and each filter information includes the transmission characteristic identifier. The transmission characteristic identifier is used to indicate a type of a traffic flow, and the transmission characteristic identifier instructs the access node of the cellular access network to determine whether a traffic flow that matches the filter corresponding to the transmission characteristic identifier needs to be transmitted by using a WLAN. In addition, each filter has a filter identifier, and there is a one-to-one correspondence between a filter identifier and a filter, that is, one filter identifier corresponds to one filter. The filter is used to match a traffic flow, that is, the filter is used to filter and obtain a traffic flow that matches the filter, and therefore, a traffic flow described by the filter may be determined according to the filter identifier. In this embodiment of the present disclosure, the filter is any type of flow description that describes a characteristic of a traffic flow, and describes a common characteristic of packets included in a traffic flow, for example, a combination of one or more of a source address and a destination address of a traffic flow, a source port and a destination port, a protocol type, a differentiated services code point DSCP), a type of service (TOS), a flow label, and an Internet Protocol security parameter index (SPI). In addition, for filter management, the filter itself has the filter information and may include information such as various identifiers of the filter. Optionally, indication information sent by the access node of the cellular access network to a UE may be the filter identifier and a bearer identifier of a bearer that is used to transmit the traffic flow matching with the filter; the UE may establish at least one PDN connection with a PDN, and each PDN connection includes at least one bearer. Each bearer has a bearer identifier used to distinguish the bearer from another bearer, and each bearer may be used to transmit at least one traffic flow; the filter that is used to match a traffic flow also has a filter identifier, and the filter identifier is used to distinguish the filter from another filter in a same bearer. Therefore, the indication information may be the filter identifier and a bearer identifier of a bearer that is used to transmit the matched traffic flow traffic flow.

In this embodiment, the filter information in the PCC rule includes the transmission characteristic identifier, that is, the filter further carries the transmission characteristic identifier, where the transmission characteristic identifier corresponds to at least one filter, that is, at least one filter has a same transmission characteristic identifier. Optionally, the transmission characteristic identifier is at least one identifier of a radio access technology (RAT) selection priority identifier, an IP address preservation requirement identifier, and a traffic flow importance identifier; or the transmission characteristic identifier is used to identify a combination of at least one piece of information of RAT selection priority information, IP address preservation requirement information, and traffic flow importance information. The RAT selection priority information/identifier may be Cellular only (if possible), Cellular preference, or WLAN preference (if possible); the IP address preservation requirement information/identifier may be Preservation only, Preservation preference, or No need; the traffic flow importance information/identifier may be high, medium, or low.

As shown in Table 1, the following uses an example to describe that the transmission characteristic identifier is at least one identifier of a RAT selection priority identifier, an IP address preservation requirement identifier, and a traffic flow importance identifier; or the transmission characteristic identifier is used to identify a combination of at least one piece of information of RAT selection priority information, IP address preservation requirement information, and traffic flow importance information.

TABLE 1

| RAT selection priority | IP address preservation requirement | Traffic flow importance | Packet identifier |
|---|---|---|---|
| Cellular only (if possible) | Preservation only | High | 1 |
| | | Medium | 2 |
| | | Low | 3 |
| | Preservation preference | High | 4 |
| | | Medium | 5 |
| | | Low | 6 |
| | No need | High | 7 |
| | | Medium | 8 |
| | | Low | 9 |
| Cellular preference | Preservation only | High | 10 |
| | | Medium | 11 |
| | | Low | 12 |
| | Preservation preference | High | 13 |
| | | Medium | 14 |
| | | Low | 15 |
| | No need | High | 16 |
| | | Medium | 17 |
| | | Low | 18 |
| WLAN preference (if possible) | Preservation only | High | 19 |
| | | Medium | 20 |
| | | Low | 21 |
| | Preservation preference | High | 22 |
| | | Medium | 23 |
| | | Low | 24 |
| | No need | High | 25 |
| | | Medium | 26 |
| | | Low | 27 |

The transmission characteristic identifier may be at least one identifier of a RAT selection priority identifier, an IP address preservation requirement identifier, and a traffic flow importance identifier; or the transmission characteristic identifier may be any one of packet identifiers 1-27, and each of the packet identifiers 1-27 may be used to identify a combination of the three information: RAT selection priority information, IP address preservation requirement information, and traffic flow importance information.

S502. The PCEF entity determines, according to the QoS information, a bearer that transmits a traffic flow that matches the filter.

In this embodiment, a specific implementation process of S502 is consistent with that in the prior art, and details are not described in this embodiment of the present disclosure. One bearer can transmit at least one traffic flow, and one bearer can transmit a traffic flow that matches a same filter, that is, one bearer corresponds to at least one filter. At least one bearer may be determined in this embodiment.

S503. The PCEF entity adds the filter and the filter information of the filter to a traffic flow template (TFT) corresponding to the bearer, and the PCEF entity sends the TFT to a UE.

In this embodiment, the TFT corresponding to the bearer may be determined after the bearer is determined; then, the filter and the filter information are added to the TFT corresponding to the bearer that is used to transmit the traffic flow matching the filter. Therefore, each TFT includes at least one filter of a traffic flow and filter information of the filter, and the filter information of each filter includes the transmission characteristic identifier. A quantity of bearers in this embodiment is M, and M is an integer greater than or equal to 1; therefore, a quantity of TFTs corresponding to the bearers is also M, and the PCEF entity may send M TFTs to the UE. That is, in a process of IP-connectivity access network (IP-CAN) session modification (IP-CAN session modification), the filter and the filter information that includes the transmission characteristic identifier are sent along with the PCC rule from the PCRF entity to the PCEF entity; the PCEF entity executes bearer setup and generates a TFT, or executes bearer modification and modifies a TFT; further, the PCEF entity performs transmission characteristic identifier marking on a filter of a traffic flow in the TFT according to the PCC rule. Specifically, a process in which the PCEF entity sends the TFT to the UE is as follows: The M TFTs are sent in an update bearer request by the PCEF entity to an SGW, and are forwarded by the SGW to an MME; then, the MME sends the M TFTs to the UE by using a non-access stratum (NAS) message.

Optionally, S503 may be that: the PCEF entity determines, according to the transmission characteristic identifier, the bearer that transmits the traffic flow matching the filter; adds the filter to a TFT corresponding to the bearer; and sends the TFT to a UE. Specifically, if transmission characteristic identifiers in the filter information are the same, the PCEF entity may add a filter to a TFT corresponding to a same bearer. The PCEF may also add a filter that is in the PCC rule and matches a traffic flow having a same transmission characteristic identifier (for example, WLAN preference (if possible)) to a TFT of a same bearer, and then the traffic flow having the same transmission characteristic identifier is transmitted over the same bearer.

S504. The UE receives the TFT sent by the PCEF entity.

S505. The PCEF entity sends a first message to the access node of the cellular access network, where the first message includes the transmission characteristic identifier, or includes the transmission characteristic identifier and a filter identifier corresponding to the transmission characteristic identifier.

In this embodiment, the quantity of the bearers is M; one bearer corresponds to one TFT; a traffic flow that matches a filter in a same TFT is transmitted by using a same bearer; therefore, after the PCEF entity determines the bearers that transmit the traffic flow matching the filter, the PCEF entity may determine filter information of a filter of a traffic flow transmitted by using each bearer, where the filter information includes the transmission characteristic identifier; then, the PCEF entity may send, to the access node of the cellular access network, a transmission characteristic identifier of a filter that matches a traffic flow transmitted separately by using the M bearers, that is, the PCEF entity sends the first message to the access node of the cellular access network, where the first message may include the transmission characteristic identifier. Further, the first message further includes the filter identifier corresponding to the transmission characteristic identifier. The PCEF entity may further determine a filter identifier of a filter that matches the traffic flow transmitted separately by using the M bearers, and then may establish a correspondence between the transmission characteristic identifier and the filter. Because one transmission characteristic identifier corresponds to at least one filter, and one filter identifier corresponds to a filter of one traffic flow, there is a correspondence between a transmission characteristic identifier and at least one filter identifier, so that the PCEF entity may determine the filter identifier corresponding to the transmission characteristic identifier, and includes the filter identifier into the first message and sends the first message to the access node of the cellular access network.

Specifically, the foregoing first message may be sent by the PCEF entity to the SGW by using an update bearer request message for bearer modification or bearer setup, and forwarded by the SGW to the MME; then, the MME sends the update bearer request message to the access node of the cellular access network, so that the access node of the cellular access network obtains the transmission characteristic identifier, or the transmission characteristic identifier and the filter identifier corresponding to the transmission characteristic identifier.

S506. The access node of the cellular access network receives the first message sent by the PCEF entity, and determines, according to the transmission characteristic identifier, that a traffic flow that matches a filter corresponding to the transmission characteristic identifier is to be transmitted by using a WLAN.

In this embodiment, the access node of the cellular access network may receive the first message, and acquire the transmission characteristic identifier according to the first message, where the first message includes the transmission characteristic identifier, or includes the transmission characteristic identifier and the filter identifier corresponding to the transmission characteristic identifier. Then, the access node of the cellular access network may determine, according to the transmission characteristic identifier, that the traffic flow that matches the filter corresponding to the transmission characteristic identifier is to be transmitted by using the WLAN, that is, the access node of the cellular access network may determine which traffic flow to be sent by the UE may be transmitted by using the WLAN.

In this embodiment, the access node of the cellular access network may determine, according to the transmission characteristic identifier, that the traffic flow that matches the filter corresponding to the transmission characteristic identifier is to be transmitted by using the WLAN. For example, according to WLAN Preference (if Possible) in the transmission characteristic identifier, the access node of the cellular access network may determine that the traffic flow corresponding to the transmission characteristic identifier is to be transmitted by using the WLAN, so that the access node of the cellular access network may determine that a traffic flow of a type indicated by the transmission characteristic identifier is to be transmitted by using the WLAN.

Further, in a feasible implementation manner, according to the transmission characteristic identifier and a combination of one or more types of the following information: a load status of the cellular access network, a load status of the WLAN, capability information of the UE, and a network connection state of the UE, the access node of the cellular access network determines that the traffic flow that matches the filter corresponding to the transmission characteristic identifier is to be transmitted by using the WLAN, where the capability information of the UE indicates whether the UE supports data transmission both on the cellular access network and on the WLAN, and the network connection state of the UE is whether the UE has accessed the WLAN. In this embodiment, for example, if the load status of the cellular access network is heavy, a part of traffic flows are transmitted by using the WLAN; if the load status of the WLAN is light, a part of traffic flows may be transmitted by using the WLAN; if the UE has a capability of supporting data transmission both on the cellular access network and on the WLAN, a part of traffic flows may be transmitted by using the WLAN; if the UE has accessed the WLAN, a part of traffic flows may be transmitted by using the WLAN. Further, before the access node of the cellular access network determines, according to the transmission characteristic identifier and the combination of one or more types of the foregoing information, that the traffic flow that matches the filter corresponding to the transmission characteristic identifier is to be transmitted by using the WLAN, the method further includes: sending, by the UE, the capability information of the UE to the access node of the cellular access network. Correspondingly, the access node of the cellular access network receives the capability information that is of the UE and is sent by the UE. The capability information of the UE may be reported, in UE radio capability or UE network capability information, by the UE to the access node of the cellular access network. Optionally, after receiving the capability information that is of the UE and is sent by the UE, the access node of the cellular access network may further send the capability information of the UE to the PCEF entity.

In a second feasible implementation manner, the access node of the cellular access network receives a second traffic flow sent by the PCEF entity, where the second traffic flow carries the transmission characteristic identifier, and the transmission characteristic identifier corresponds to a filter that matches the second traffic flow; the access node of the cellular access network separately collects, during a preset time, statistics about a combination of one or more types of the following information of the second traffic flow: traffic of the second traffic flow, a proportion of the traffic of the second traffic flow in traffic of all downlink traffic flows of the UE, a proportion of the traffic of the second traffic flow in traffic of a bearer that bears the downlink traffic flow, and a proportion of the traffic of the second traffic flow in traffic of a PDN connection by using which the second traffic flow is transmitted, where the PDN connection includes at least one bearer; according to the statistics collected about the combination of one or more types of the information of the second traffic flow, the access node of the cellular access network determines that the traffic flow that matches the filter corresponding to the transmission characteristic identifier is to be transmitted by using the WLAN. In this embodiment, the access node of the cellular access network may receive the second traffic flow sent by the PCEF entity, and the second traffic flow carries the transmission characteristic identifier separately. The second traffic flow is a downlink traffic flow; there is an uplink traffic flow corresponding to the downlink traffic flow, and the downlink traffic flow and the uplink traffic flow have a same transmission characteristic identifier. Then, during the preset time, the access node of the cellular access network collects statistics about the combination of one or more types of the foregoing information of the second traffic flow; if the traffic of the second traffic flow is little, the uplink traffic flow corresponding to the second traffic flow may be transmitted by using the WLAN; if the proportion of the traffic of the second traffic flow in the traffic of all downlink traffic flows of the UE is small, the uplink traffic flow corresponding to the second traffic flow may be transmitted by using the WLAN; if the proportion of the traffic of the second traffic flow in the traffic of the bearer that bears the downlink traffic flow is small, the uplink traffic flow corresponding to the second traffic flow may be transmitted by using the WLAN; if the proportion of the traffic of the second traffic flow in the traffic of the PDN connection by using which the downlink traffic flow is transmitted is small, the uplink traffic flow corresponding to the second traffic flow may be transmitted by using the WLAN. Optionally, a differentiated services code point (DSCP) in an IP header of a data packet of the second traffic flow carries a transmission characteristic identifier that is used to indicate a type of the second traffic flow, or a header of a GPRS Tunneling Protocol for the user plane (GTP-U) packet that bears a data packet of the second traffic flow carries a transmission characteristic identifier that is used to indicate a type of the second traffic flow.

S507. The access node of the cellular access network determines indication information, where the indication information includes a filtering condition, and the indication information is used to instruct the UE to transmit, by using the WLAN, a traffic flow that meets the filtering condition.

S508. The UE receives the indication information sent by the access node of the cellular access network, and determines, according to the indication information, that a first traffic flow meets the filtering condition.

In a first feasible implementation manner, after determining, according to the transmission characteristic identifier, that the traffic flow that matches the filter corresponding to the transmission characteristic identifier is to be transmitted by using the WLAN, the access node of the cellular access network determines the indication information and sends the indication information to the UE, where the indication information includes the filtering condition; the filtering condition includes a first identifier; the first identifier includes at least one of the transmission characteristic identifier and the filter identifier, and the transmission characteristic identifier corresponds to the filter identifier. The traffic flow that meets the filtering condition includes: the first traffic flow, where the first traffic flow matches a first filter and filter information of the first filter includes the first identifier. One traffic flow matches one filter, and then a filter that matches the first traffic flow may be determined according to the first traffic flow, and the filter may be referred to as the first filter. Correspondingly, that the UE determines, according to the indication information, that a first traffic flow meets the filtering condition includes that: the UE determines, if the first traffic flow matches the first filter and the filter information of the first filter includes the first identifier, that the first traffic flow meets the filtering condition. Further, in a first case, the filtering condition further includes a bearer identifier, where the first filter is a filter of a bearer corresponding to the bearer identifier; correspondingly, that the UE determines, according to the indication information, that a first traffic flow meets the filtering condition further includes that: the UE determines that the first filter is the filter of the bearer corresponding to the bearer identifier. In a second case, the filtering condition further includes a PDN connection identity or a PDN identity, where the first filter is a filter of a PDN connection corresponding to the PDN connection identity, or the first filter is a filter of a PDN connection corresponding to the PDN identity. Correspondingly, that the UE determines, according to the indication information, that a first traffic flow meets the filtering condition further includes that: the UE determines that the first filter is the filter of the PDN connection corresponding to the PDN connection identity, or the UE determines that the first filter is the filter of the PDN connection corresponding to the PDN identity. Further, on the basis of the first case, the filtering condition further includes the PDN connection identity or the PDN identity, the bearer corresponding to the bearer identifier is a bearer of the PDN connection corresponding to the PDN connection identity, or the bearer corresponding to the bearer identifier is a bearer of the PDN connection corresponding to the PDN identity. Correspondingly, that the UE determines, according to the indication information, that a first traffic flow meets the filtering condition further includes that: the UE determines that the bearer corresponding to the bearer identifier is the bearer of the PDN connection corresponding to the PDN connection identity, or the UE determines that the bearer corresponding to the bearer identifier is the bearer of the PDN connection corresponding to the PDN identity. In this embodiment, the PDN connection may be determined according to the PDN connection identity or the PDN identity, where the PDN identity may be an access point name (APN) of a PDN.

In a second feasible implementation manner, the filtering condition includes a bearer identifier, where the traffic flow that meets the filtering condition includes: the first traffic flow, where the first traffic flow matches the first filter and the first filter is a filter of a bearer corresponding to the bearer identifier. Correspondingly, that the UE determines, according to the indication information, that a first traffic flow meets the filtering condition further includes that: the UE determines, if the first traffic flow matches the first filter and the first filter is the filter of the bearer corresponding to the bearer identifier, that the first traffic flow meets the filtering condition. Further, the filtering condition further includes a PDN connection identity or a PDN identity, the bearer corresponding to the bearer identifier is a bearer of a PDN connection corresponding to the PDN connection identity, or the bearer corresponding to the bearer identifier is a bearer of a PDN connection corresponding to the PDN identity. Correspondingly, that the UE determines, according to the indication information, that a first traffic flow meets the filtering condition further includes that: the UE determines that the bearer corresponding to the bearer identifier is the bearer of the PDN connection corresponding to the PDN connection identity, or the UE determines that the bearer corresponding to the bearer identifier is the bearer of the PDN connection corresponding to the PDN identity.

In a third feasible implementation manner, the filtering condition includes the transmission characteristic identifier, where the traffic flow that meets the filtering condition includes: the first traffic flow, where a transmission characteristic identifier of an application program corresponding to the first traffic flow is the transmission characteristic identifier. Correspondingly, that the UE determines, according to the indication information, that a first traffic flow meets the filtering condition further includes that: the UE determines, if the transmission characteristic identifier of the application program corresponding to the first traffic flow is the transmission characteristic identifier in the filtering condition, that the first traffic flow meets the filtering condition. It should be noted that the transmission characteristic identifier of the application program may be sent to the UE by using an interface established between an ANDSF entity or the PCRF entity and the UE.

S509. The UE transmits the first traffic flow to the PCEF entity by using the WLAN.

In this embodiment, after determining the first traffic flow that meets the filtering condition, the UE transmits the first traffic flow to the PCEF entity by using the WLAN.

It should be noted that the UE may send, to the PCEF entity by using the WLAN, all traffic flows that are transmitted by using a same bearer, or the UE may send, to the PCEF entity by using the WLAN, all traffic flows over all bearers that belong to a same PDN connection.

Figure 8:
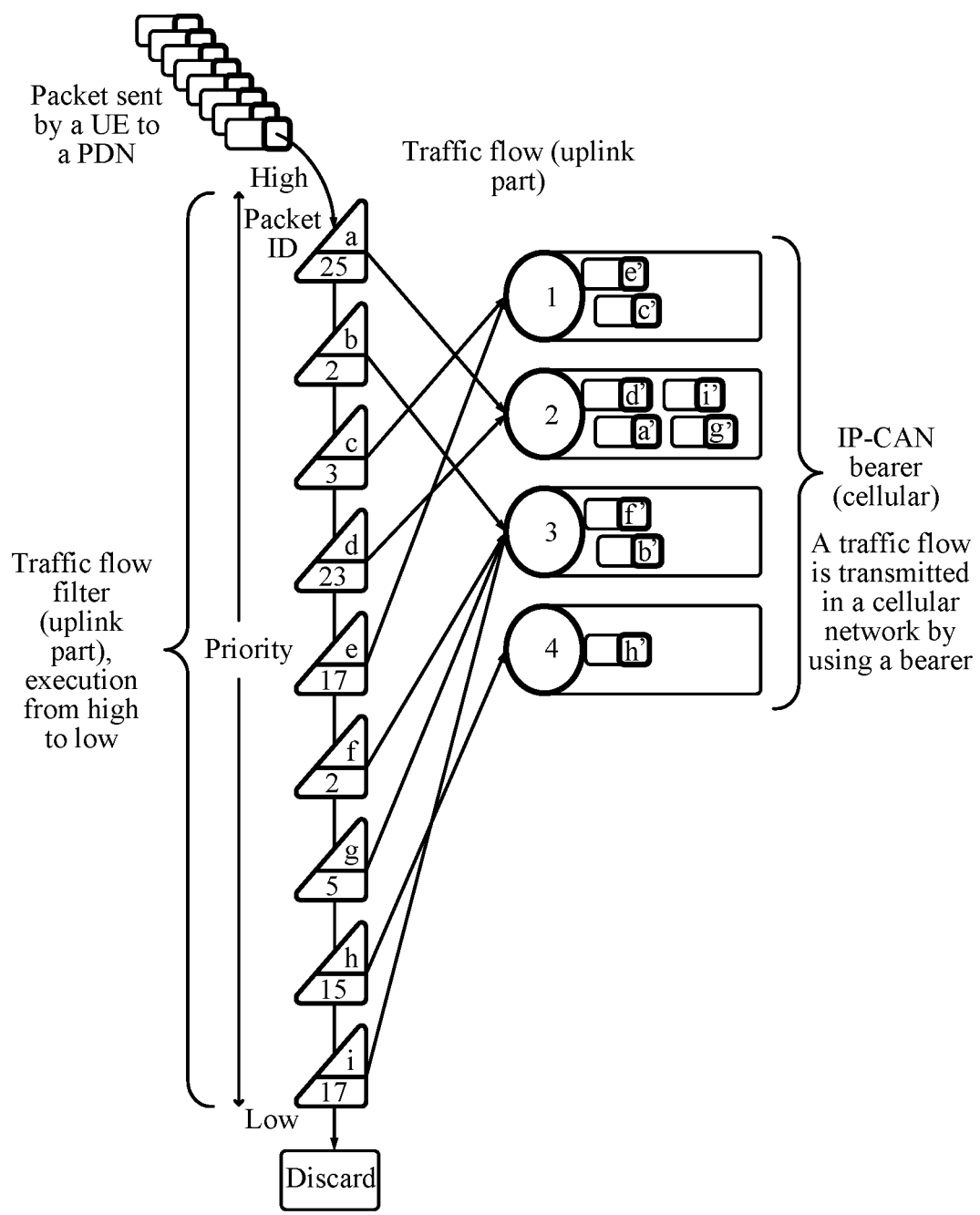
FIG. 8 is a diagram of a mapping relationship between a bearer and a filter in a data transmission method according to an embodiment of the present disclosure.

FIG. 8 is a diagram of a mapping relationship between a bearer and a filter in the data transmission method according to this embodiment of the present disclosure. As shown in FIG. 8, in a process in which a UE transmits a traffic flow to a PDN, there may be four bearers, which are respectively a bearer 1, a bearer 2, a bearer 3, and a bearer 4. Each bearer corresponds to one TFT; a TFT corresponding to the bearer 1 includes a filter c and a filter e; a TFT corresponding to the bearer 2 includes a filter a, a filter d, a filter g, and a filter i; a TFT corresponding to the bearer 3 includes a filter b and a filter f; a TFT corresponding to the bearer 4 includes a filter h. In addition, the filters are sorted according to a priority. For example, the filter a carries a transmission characteristic identifier (that is, a packet identifier (ID) is 25); the filter b carries a transmission characteristic identifier (that is, a packet ID is 2); the filter c carries a transmission characteristic identifier (that is, a packet ID is 3); the filter d carries a transmission characteristic identifier (that is, a packet ID is 23); the filter e carries a transmission characteristic identifier (that is, a packet ID is 17); the filter f carries a transmission characteristic identifier (that is, a packet ID is 2); the filter g carries a transmission characteristic identifier (that is, a packet ID is 5); the filter h carries a transmission characteristic identifier (that is, a packet ID is 15); the filter i carries a transmission characteristic identifier (that is, a packet ID is 17); where information corresponding to a packet ID may be shown in the foregoing Table 1. If the access node of the cellular access network does not send the indication information to the UE, when a packet of a traffic flow that is to be sent to the PDN exists in the UE, the UE may perform matching between a traffic flow and a filter according to a priority of the filter. If the traffic flow matches the filter, the traffic flow is transmitted by using a bearer corresponding to the filter; if the traffic flow does not match any filter, the traffic flow is discarded. That is, a traffic flow c' that matches the filter c and a traffic flow e' that matches the filter e are transmitted over the bearer 1 by using the cellular access network; a traffic flow a' that matches the filter a, a traffic flow d' that matches the filter d, a traffic flow g' that matches the filter g, and a traffic flow i' that matches the filter i are transmitted over the bearer 2 by using the cellular access network; a traffic flow b' that matches the filter b and a traffic flow f that matches the filter f are transmitted over the bearer 3 for by using the cellular access network; a traffic flow h' that matches the filter h is transmitted over the bearer 4 by using the cellular access network.

Figure 9:
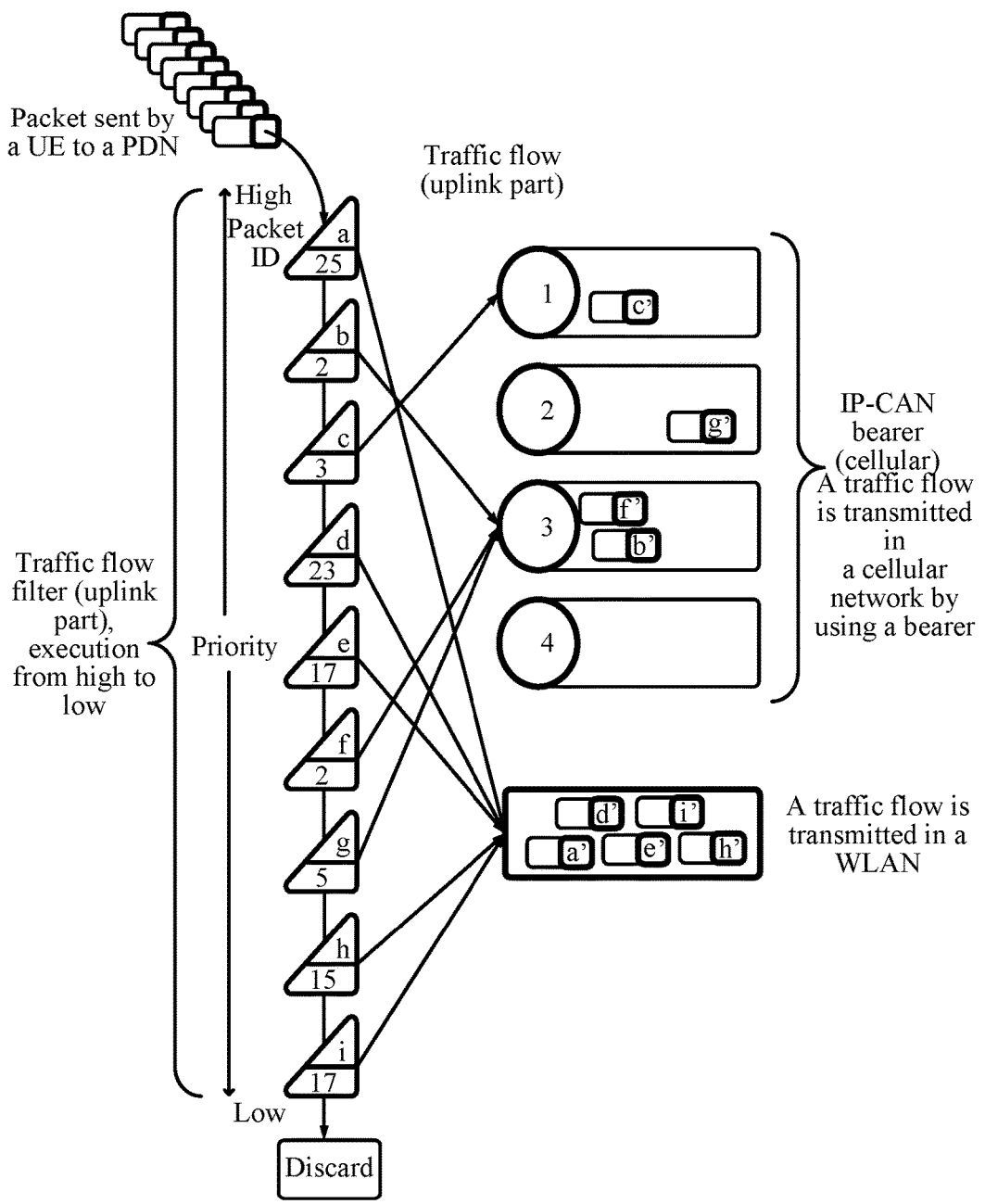
FIG. 9 is a diagram of a mapping relationship between a bearer and a filter in a data transmission method according to an embodiment of the present disclosure.

FIG. 9 is a diagram of a mapping relationship between a bearer and a filter in the data transmission method according to this embodiment of the present disclosure. As shown in FIG. 9, a filter a, a filter b, a filter c, a filter d, a filter e, a filter f, a filter g, a filter h, and a filter i exist on a UE side, and the filters are sorted according to a priority. If transmission is performed by using the cellular access network, a bearer 1 corresponds to the filter c and the filter e; a bearer 2 corresponds to the filter a, the filter d, the filter g, and the filter i; a bearer 3 corresponds to the filter b and the filter f; a bearer 4 corresponds to the filter h. For example, the filter a carries a transmission characteristic identifier (that is, a packet ID is 25); the filter b carries a transmission characteristic identifier (that is, a packet ID is 2); the filter c carries a transmission characteristic identifier (that is, a packet ID is 3); the filter d carries a transmission characteristic identifier (that is, a packet ID is 23); the filter e carries a transmission characteristic identifier (that is, a packet ID is 17); the filter f carries a transmission characteristic identifier (that is, a packet ID is 2); the filter g carries a transmission characteristic identifier (that is, a packet ID is 5); the filter h carries a transmission characteristic identifier (that is, a packet ID is 15); the filter i carries a transmission characteristic identifier (that is, a packet ID is 17); where information corresponding to a packet ID may be shown in the foregoing Table 1. If the access node of the cellular access network determines that traffic flows of types indicated by the packet IDs 15, 17, 23, and 25 may be transmitted by using a WLAN, the access node of the cellular access network sends the indication information to the UE, where the indication information includes the packet IDs 15, 17, 23, and 25; then, the UE may determine the filter a, the filter d, the filter e, the filter h, and the filter i that respectively carry these packet IDs. The UE transmits, by using the WLAN, a traffic flow a' that matches the filter a, a traffic flow d' that matches the filter d, a traffic flow e' that matches the filter e, a traffic flow h' that matches the filter h, and a traffic flow i' that matches the filter i; then, transmits a traffic flow c' that matches the filter c over the bearer 1 by using the cellular access network, transmits a traffic flow g' that matches the filter g over the bearer 2 by using the cellular access network, and transmits a traffic flow b' that matches the filter b and a traffic flow f' that matches the filter f over the bearer 3 by using the cellular access network. It should be noted that the access node of the cellular access network sends the indication information to the UE to indicate that the first traffic flow that matches the first filter may be transmitted by using the WLAN, where a priority of the first filter may be adjusted to the highest or the lowest, and if there are multiple first filters indicated, a relative sequence thereof may be unchanged.

Further, this embodiment may further include:

S510. When the capability information of the UE indicates that the UE supports data transmission both on the cellular access network and on the WLAN, the PCEF entity sends a third traffic flow to the UE by using the WLAN.

In this embodiment, the PCEF entity may receive the capability information that is of the UE and is sent by the access node of the cellular access network, where the capability information of the UE indicates whether the UE supports data transmission both on the cellular access network and on the WLAN. When the capability information of the UE indicates that the UE supports data transmission both on the cellular access network and on the WLAN, the PCEF entity sends the third traffic flow to the UE by using the WLAN, where the third traffic flow is the traffic flow that matches the filter corresponding to the transmission characteristic identifier. In this embodiment, one downlink traffic flow corresponds to one uplink traffic flow; the downlink traffic flow and the uplink traffic flow may match a same filter, and the third traffic flow is a downlink traffic flow.

In a first feasible implementation manner, according to the first traffic flow that is received by using the WLAN and is sent by the UE, the PCEF entity determines to send the third traffic flow to the UE by using the WLAN, where the first traffic flow is the traffic flow that matches the filter corresponding to the transmission characteristic identifier. The PCEF entity may determine to receive, by using the WLAN, the first traffic flow sent by the UE, where the first traffic flow is the traffic flow that matches the filter corresponding to the transmission characteristic identifier; then, the PCEF entity determines to send, by using the WLAN, the third traffic flow (a downlink traffic flow) corresponding to the first traffic flow (an uplink traffic flow) to the UE. Specifically, the PCEF entity may perform detection on a data packet of a first traffic flow that is of a same UE and belongs to a same PDN connection, so as to determine whether the first data packet is transmitted to the PCEF entity by using the WLAN or the cellular access network. If the first traffic flow is transmitted by using the WLAN, the PCEF entity may send a downlink traffic flow that is in the PCC rule and corresponds to the first traffic flow, that is, the third traffic flow to the UE by using the WLAN; if the first traffic flow is transmitted by using the cellular access network, the PCEF entity may transmit a downlink traffic flow that is in the PCC rule and corresponds to the first traffic flow, that is, the third traffic flow to the UE by using the cellular access network.

In a second feasible implementation manner, the PCEF entity determines, according to a preset policy, to send the third traffic flow to the UE by using the WLAN. Specifically, the PCEF entity may determine, according to the preset policy, which downlink traffic flow may be sent to the UE by using the WLAN, where the preset policy may be an operator policy, and the policy may specify that all traffic flows sent by the PCEF entity to the UE be transmitted by using the WLAN. The preset policy may be determined according to a subscriber to which the UE belongs, a location of the UE, time, a type of a downlink traffic flow, a charge rate, a subscriber package, a subscriber account balance, and the like; the preset policy may be determined according to an actual application scenario, which is not limited in this embodiment of the present disclosure.

In a third feasible implementation manner, the access node of the cellular access network sends downlink indication information to the PCEF entity, where the downlink indication information instructs the PCEF entity to transmit, by using the WLAN, that the traffic flow that matches the filter corresponding to the transmission characteristic identifier; the PCEF entity determines, according to the downlink indication information sent by the access node of the cellular access network, to send the third traffic flow to the UE by using the WLAN; the PCEF entity sends the determined traffic flow to the UE by using the WLAN.

In this embodiment, the access node of the cellular access network may determine a transmission characteristic identifier that is used by the PCEF entity to indicate a type of a traffic flow that is sent to the UE by using the WLAN, and then the access node of the cellular access network sends the downlink indication information to the PCEF entity. It should be noted that a transmission characteristic identifier in the downlink indication information may be the same as or different from a transmission characteristic identifier that is of an uplink traffic flow transmitted by the UE by using the WLAN and is determined by the access node of the cellular access network.

Further, the downlink indication information in this embodiment further includes a PDN connection identity or a PDN identity, where the traffic flow that matches the filter corresponding to the transmission characteristic identifier is a traffic flow of a PDN connection corresponding to the PDN connection identity, or the traffic flow that matches the filter corresponding to the transmission characteristic identifier is a traffic flow of a PDN connection corresponding to the PDN identity.

According to the data transmission method provided in this embodiment of the present disclosure, an access node of a cellular access network receives a first message sent by a PCEF entity, determines that a traffic flow that matches a filter corresponding to a transmission characteristic identifier is to be transmitted by using a WLAN, and then sends indication information to a UE; the UE determines, according to the indication information, that a first traffic flow meets a filtering condition in the indication information, and then transmits the first traffic flow to the PCEF entity by using the WLAN. Therefore, according to an indication of the access node of the cellular access network, the UE may choose to transmit an uplink traffic flow by using the WLAN, so that the UE completes WLAN route selection for the traffic flow and matching of a cellular access network transmission bearer at a time, which is simple in implementation; in addition, when an access device of the cellular access network sends indication information, a real-time status of the cellular access network and the WLAN network and a characteristic of the traffic flow are considered, thereby improving data transmission efficiency; and a downlink traffic flow may also be transmitted by using the WLAN.

Figure 10:
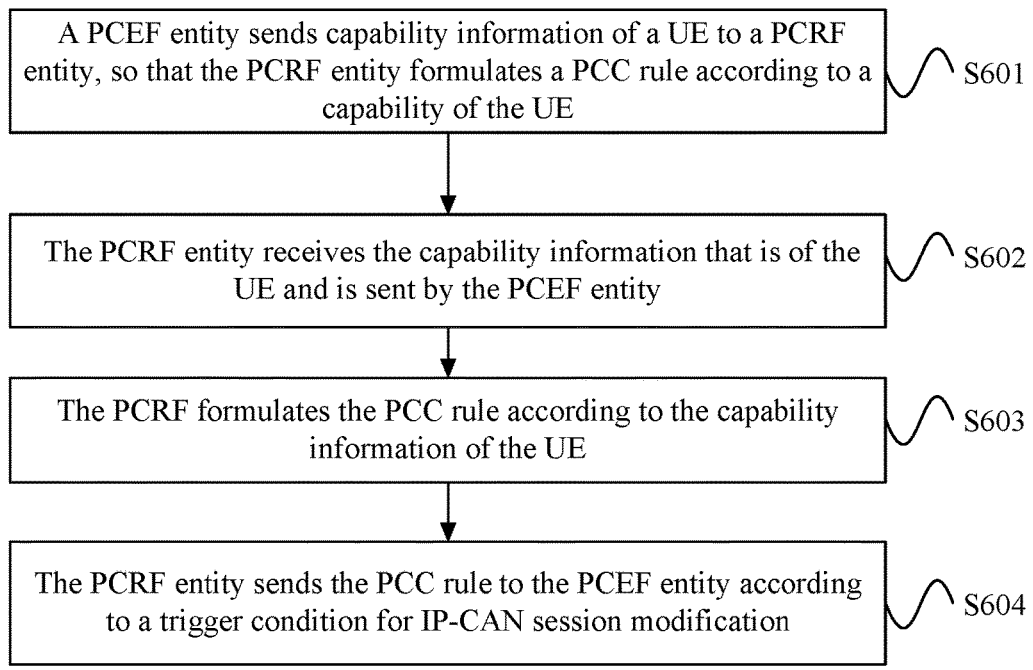
FIG. 10 is a flowchart of a data transmission method according to an embodiment of the present disclosure.

FIG. 10 is a flowchart of a data transmission method according to an embodiment of the present disclosure. As shown in FIG. 10, on the basis of the foregoing method embodiments, the method in this embodiment further includes:

S601. A PCEF entity sends capability information of a UE to a PCRF entity, so that the PCRF entity formulates a PCC rule according to a capability of the UE.

S602. The PCRF entity receives the capability information that is of the UE and is sent by the PCEF entity.

S603. The PCRF formulates the PCC rule according to the capability information of the UE.

S604. The PCRF entity sends the PCC rule to the PCEF entity according to a trigger condition for IP-CAN session modification.

In this embodiment, the PCEF entity may receive the capability information that is of the UE and is sent by an access node of a cellular access network, where the capability information of the UE indicates whether the UE supports data transmission both on the cellular access network and on a WLAN; then, the PCEF entity sends the capability information of the UE to the PCRF entity, and the PCRF entity receives the capability information of the UE; if the capability information of the UE indicates that the UE supports data transmission both on the cellular access network and on the WLAN, the PCRF entity formulates the PCC rule according to the capability information of the UE, and the PCC rule includes a filter corresponding to a transmission characteristic identifier, filter information of the filter, and quality of service QoS information corresponding to the filter, where the filter information of the filter includes the transmission characteristic identifier. The transmission characteristic identifier is at least one identifier of a radio access technology RAT selection priority identifier, an IP address preservation requirement identifier, and a traffic flow importance identifier; or the transmission characteristic identifier is used to identify a combination of at least one piece of information of RAT selection priority information, IP address preservation requirement information, and traffic flow importance information.

After formulating the PCC rule, the PCRF entity sends the PCC rule to the PCEF entity according to the trigger condition for the IP-CAN session modification, where the trigger condition for the IP-CAN session modification includes at least one of the following: UE location change information, information about operator service usage of the UE, and traffic flow content information of the UE, and the information about operator service usage of the UE includes at least one of the following: package information, balance information, account change information, network load adjustment information, and UE subscription change information.

Specifically, the access node of the cellular access network sends the capability information of the UE to an MME; the MME forwards the capability information of the UE to an SGSN; the SGSN forwards the capability information of the UE to an SGW; the SGW forwards the capability information of the UE to the PCEF entity; then, the PCEF entity sends the capability information of the UE to the PCRF, where a specific implementation manner in which the PCRF entity formulates the PCC rule according to the capability information of the UE is as follows: The PCRF entity allocates, in the PCC rule, if the UE has a capability of supporting data transmission both on the cellular access network and on the WLAN, a transmission characteristic identifier to a filter that matches a traffic flow; or formulates in the PCC rule that QoS information corresponding to a filter of a traffic flow of a transmission characteristic identifier (for example, WLAN preference (if possible)) is the same; or formulates in the PCC rule that QoS information corresponding to a filter to which a same transmission characteristic identifier is allocated is the same.

Figure 11:
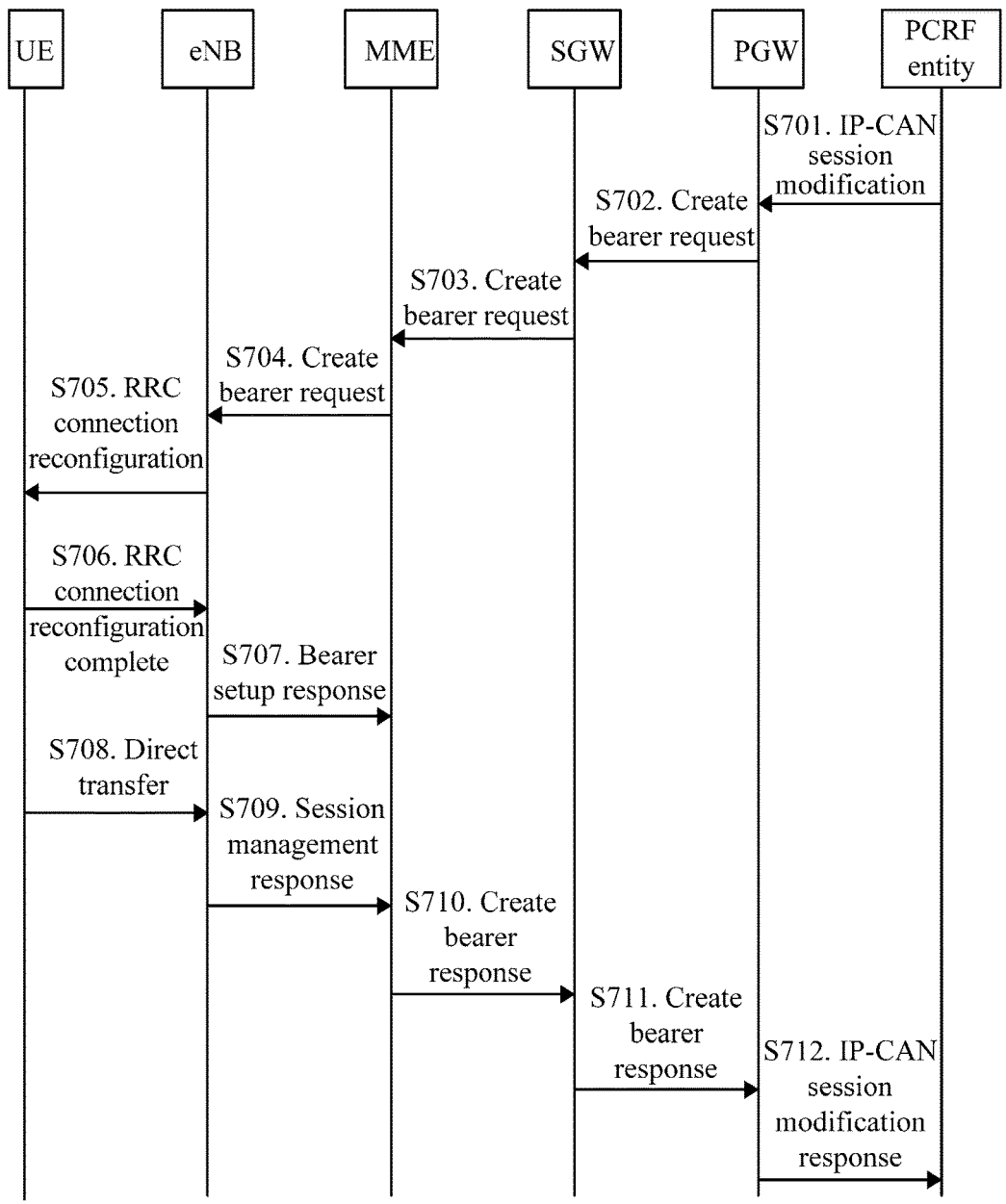
FIG. 11 is a schematic diagram of a bearer setup process in a data transmission method according to an embodiment of the present disclosure.

The following uses an example to describe how the PCEF entity sends a TFT to the UE. The PCRF entity may send the TFT to the UE by means of a bearer setup process, or the PCEF entity may send the TFT to the UE by means of a bearer update process. FIG. 11 is a schematic diagram of a bearer setup process in a data transmission method according to an embodiment of the present disclosure. As shown in FIG. 11, the bearer setup process in this embodiment may be as follows:

S701. IP-CAN session modification.

The IP-CAN session modification is performed between the PCRF entity and a PGW; the PCRF entity may trigger the IP-CAN session modification, where the trigger condition for the IP-CAN session modification is: UE location change, or operator service usage of the UE and traffic flow content of the UE, and the operator service usage of the UE may include one or more of: a package, a balance, an account change, network load adjustment, and a UE subscription change. In a process of the IP-CAN session modification, a filter of a traffic flow that carries second identification information is delivered from the PCRF entity to the PGW along with the PCC rule, that is, delivered to the PCEF entity. The second identification information may be a packet identifier, or may be property information identified by a packet identifier. The PGW may determine bearers, that is, M bearers transmitting a traffic flow that matches a filter, and add the filter and the second identification information of the filter of the traffic flow to a TFT corresponding to the determined bearers.

S702. Create bearer request.

The PGW sends the create bearer request to an SGW, where the Create Bearer Request includes M TFTs and second identification information of filters of traffic flows transmitted separately by using the M bearers.

S703. Create bearer request.

The SGW sends the create bearer request to an MME, where the Create Bearer Request includes the M TFTs and the second identification information of the filters of the traffic flows transmitted separately by using the M bearers.

S704. Bearer setup request.

The MME sends the bearer setup request to an eNB, where the Bearer Setup Request further includes the second identification information of the filters of the traffic flows transmitted separately by using the M bearers and a non-access stratum signaling NAS unit that includes a session management request, where the session management request includes the M TFTs.

S705. RRC connection reconfiguration.

The eNB sends the RRC connection reconfiguration to the UE, where the RRC Connection Reconfiguration includes the non-access stratum signaling NAS unit that includes the foregoing session management request, so that the UE can acquire the M TFTs by using the RRC Connection Reconfiguration.

Further, after the eNB sends the M TFTs to the UE, the eNB may further determine which traffic flow may be transmitted by the UE by using the WLAN; then, the eNB may determine second identification information corresponding to a traffic flow transmitted by using the WLAN, and the eNB may include the second identification information into the RRC Connection Reconfiguration and sends the RRC connection reconfiguration to the UE.

S706. RRC connection reconfiguration complete.

The UE sends the RRC connection reconfiguration complete to the eNB.

S707. Bearer setup response.

The eNB sends the bearer setup response to the MME.

S708. Direct transfer.

The UE sends the direct transfer to the eNB.

S709. Session management response.

The eNB sends the session management response to the MME.

S710. Create bearer response.

The MME sends the create bearer response to the SGW.

S711. Create bearer response.

The SGW sends the create bearer response to the PGW.

S712. IP-CAN session modification response.

The PGW sends the IP-CAN session modification response to the PCRF entity, so as to complete the IP-CAN session modification.

Figure 12:
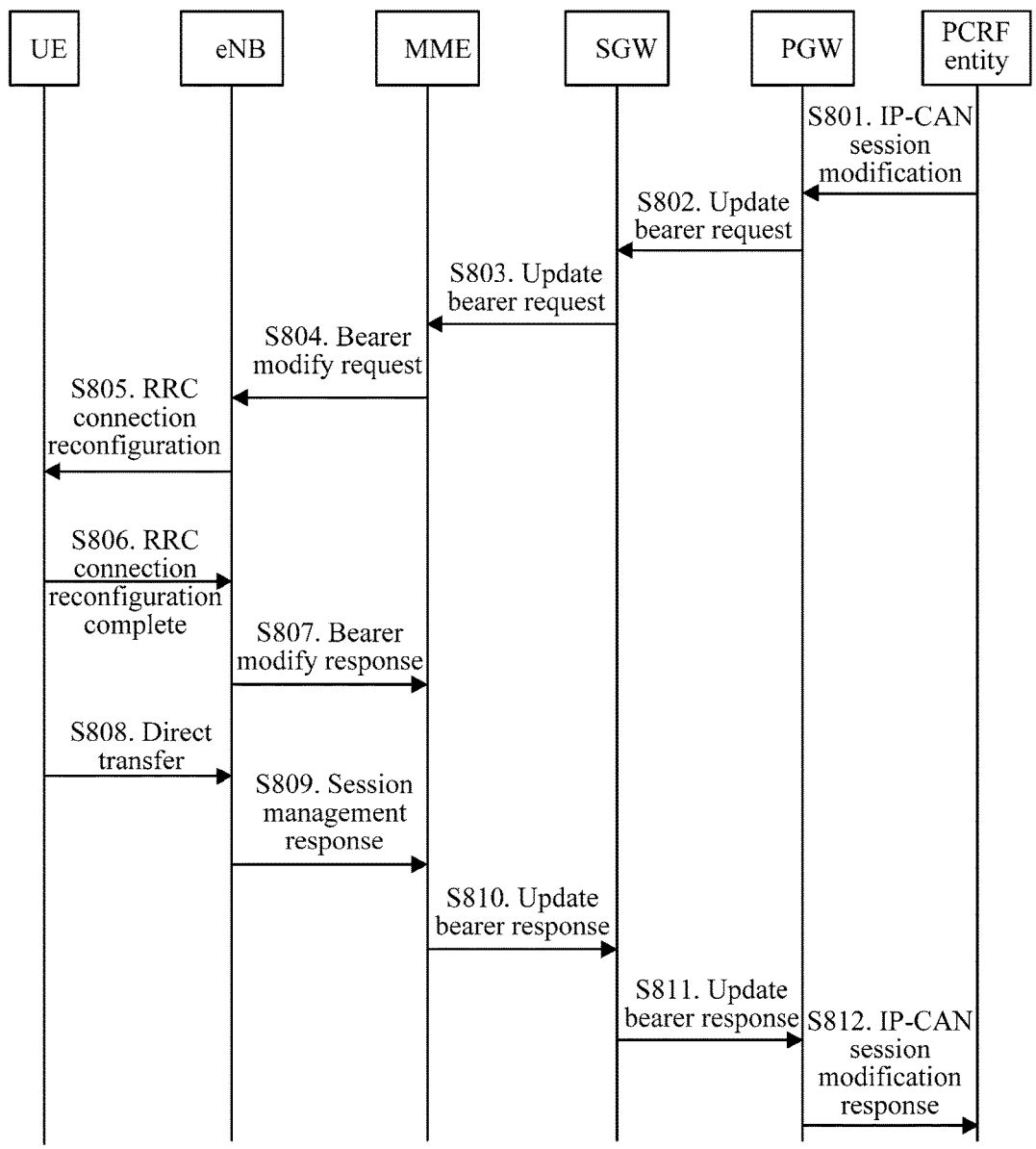
FIG. 12 is a schematic diagram of a bearer update process in a data transmission method according to an embodiment of the present disclosure.

FIG. 12 is a schematic diagram of a bearer update process in a data transmission method according to an embodiment of the present disclosure. As shown in FIG. 12, the bearer update process in this embodiment may be as follows:

S801. IP-CAN session modification.

The IP-CAN session modification is performed between the PCRF entity and a PGW; the PCRF entity may trigger the IP-CAN session modification, where the trigger condition for the IP-CAN session modification is: UE location change, or operator service usage of the UE, and traffic flow content of the UE, and the operator service usage of the UE may include one or more of: a package, a balance, an account change, network load adjustment, and a UE subscription change. In a process of the IP-CAN session modification, a filter of a traffic flow that carries second identification information is delivered from the PCRF entity to the PGW along with the PCC rule, that is, delivered to the PCEF entity. The second identification information may be a packet identifier, or may be property information identified by a packet identifier. The PGW may determine bearers, that is, M bearers transmitting a traffic flow that matches a filter, and add the filter and the second identification information of the filter of the traffic flow to a TFT corresponding to the determined bearers.

S802. Update bearer request.

The PGW sends the update bearer request to an SGW, where the Update Bearer Request includes M TFTs and second identification information of filters of traffic flows transmitted separately by using the M bearers.

S803. Update bearer request.

The SGW sends the update bearer request to an MME, where the Update Bearer Request includes the M TFTs and the second identification information of the filters of the traffic flows transmitted separately by using the M bearers.

S804. Bearer modify request.

The MME sends the bearer modify request to an eNB, where the Bearer Modify Request further includes the second identification information of the filters of the traffic flows transmitted separately by using the M bearers and a non-access stratum signaling NAS unit that includes a session management request, where the session management request includes the M TFTs.

S805. RRC connection reconfiguration.

The eNB sends the RRC connection reconfiguration to the UE, where the RRC Connection Reconfiguration includes the non-access stratum signaling NAS unit that includes the foregoing session management request, so that the UE can acquire the M TFTs by using the RRC Connection Reconfiguration.

Further, after the eNB sends the M TFTs to the UE, the eNB may further determine which traffic flow may be transmitted by the UE by using the WLAN; then, the eNB may determine second identification information corresponding to a traffic flow transmitted by using the WLAN, and the eNB may include the second identification information into the RRC Connection Reconfiguration and sends the RRC connection reconfiguration to the UE.

S806. RRC connection reconfiguration complete.

The UE sends the RRC connection reconfiguration complete to the eNB.

S807. Bearer modify response.

The eNB sends the bearer modify response to the MIME.

S808. Direct transfer.

The UE sends the direct transfer to the eNB.

S809. Session management response.

The eNB sends the session management response to the MME.

S810. Update bearer response.

The MME sends the update bearer response to the SGW.

S811. Update bearer response.

The SGW sends the update bearer response to the PGW.

S812. IP-CAN session modification response.

The PGW sends the IP-CAN session modification response to the PCRF entity, so as to complete the IP-CAN session modification.

Interaction between the foregoing PCRF entity and the PGW is S601 and S612, and S701 and S712; a specific interaction process may be that: The PCRF entity sends the PCC rule to the PGW (Policy and Charging Rules Provision), and the PGW sends a PCC rule provision acknowledgment (ACK) to the PCRF entity.

The IP-CAN session modification may also be triggered by the PGW, and then the interaction between the foregoing PCRF entity and the PGW may be that: The PGW sends the IP-CAN session modification (Indication of IP-CAN modification) to the PCRF entity, and the PCRF entity sends an IP-CAN session modification acknowledgment (Acknowledge IP-CAN Session Modification) to the PGW, where the IP-CAN session modification acknowledgment carries the PCC rule, and then the PGW sends the PCC rule provision acknowledgment (Provision ACK) to the PCRF entity.

Figure 13:
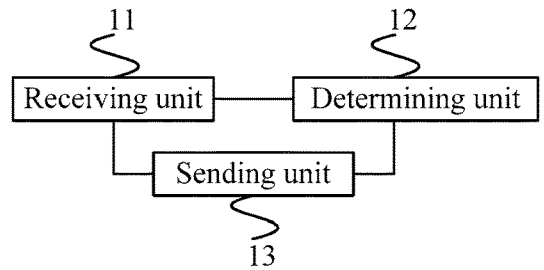
FIG. 13 is a schematic structural diagram of a UE according to an embodiment of the present disclosure.

FIG. 13 is a schematic structural diagram of a UE according to an embodiment of the present disclosure. As shown in FIG. 13, the UE in this embodiment may include: a receiving unit 11, a determining unit 12, and a sending unit 13. The receiving unit 11 is configured to receive indication information sent by an access node of a cellular access network, where the indication information includes a filtering condition, and the indication information is used to instruct the UE to transmit, by using a wireless local area network WLAN, a traffic flow that meets the filtering condition; the determining unit 12 is configured to determine, according to the indication information received by the receiving unit 11, that a first traffic flow meets the filtering condition; and the sending unit 13 is configured to transmit, by using the WLAN, the first traffic flow, if, as determined by the determining unit 12, the first traffic flow meets the filtering condition.

The UE in this embodiment may be configured to execute a technical solution executed by a UE in the foregoing method embodiments, and implementation principles and technical effects of the UE are similar. For details, refer to related descriptions in the foregoing method embodiments, which are not described herein again.

In another embodiment of the UE, the UE in this embodiment is based on a structure of the UE shown in FIG. 13.

Further, in a first feasible implementation manner, the filtering condition includes a first identifier, where the first identifier includes at least one of a transmission characteristic identifier and a filter identifier, and the transmission characteristic identifier corresponds to the filter identifier; the determining unit 12 is specifically configured to determine, if the first traffic flow matches a first filter and filter information of the first filter includes the first identifier, that the first traffic flow meets the filtering condition. Further, in a first case, the filtering condition further includes a bearer identifier; the determining unit 12 is further configured to determine, according to the indication information received by the receiving unit 11, that the first filter is a filter of a bearer corresponding to the bearer identifier. In a second case, the filtering condition further includes a PDN connection identity or a PDN identity; the determining unit 12 is further configured to determine, according to the indication information received by the receiving unit 11, that the first filter is a filter of a PDN connection corresponding to the PDN connection identity, or determine that the first filter is a filter of a PDN connection corresponding to the PDN identity. Further, on the basis of the first case, the filtering condition further includes the packet data network PDN connection identity or the PDN identity; the determining unit 12 is further configured to determine, according to the indication information received by the receiving unit 11, that the bearer corresponding to the bearer identifier is a bearer of the PDN connection corresponding to the PDN connection identity, or determine, according to the indication information received by the receiving unit 11, that the bearer corresponding to the bearer identifier is a bearer of the PDN connection corresponding to the PDN identity.

In a second feasible implementation manner, the filtering condition includes a bearer identifier; the determining unit 12 is specifically configured to determine, if the first traffic flow matches a first filter and the first filter is a filter of a bearer corresponding to the bearer identifier, that the first traffic flow meets the filtering condition. Further, the filtering condition further includes a PDN connection identity or a PDN identity; the determining unit 12 is further configured to determine, according to the indication information received by the receiving unit 11, that the bearer corresponding to the bearer identifier is a bearer of a PDN connection corresponding to the PDN connection identity, or determine, according to the indication information received by the receiving unit 11, that the bearer corresponding to the bearer identifier is a bearer of a PDN connection corresponding to the PDN identity.

In a third feasible implementation manner, the filtering condition includes a transmission characteristic identifier; the determining unit 12 is specifically configured to determine, if a transmission characteristic identifier of an application program corresponding to the first traffic flow is the transmission characteristic identifier, that the first traffic flow meets the filtering condition.

Optionally, the transmission characteristic identifier is at least one identifier of a radio access technology RAT selection priority identifier, an Internet Protocol IP address preservation requirement identifier, and a traffic flow importance identifier; or the transmission characteristic identifier is used to identify a combination of at least one piece of information of RAT selection priority information, IP address preservation requirement information, and traffic flow importance information.

Optionally, the receiving unit 11 is further configured to, before receiving the indication information sent by the access node of the cellular access network, receive a traffic flow template TFT sent by a policy and charging enforcement function PCEF entity, where the TFT includes filter information of a filter that matches the first traffic flow, and the filter information includes the transmission characteristic identifier.

Optionally, the indication information further includes an indication indicating whether to preserve an IP address of the UE; the indication information is further used to indicate whether to use, when the UE transmits the first traffic flow by using the WLAN, an IP address of the UE when the access node of the cellular access network transmits the first traffic flow.

Optionally, the sending unit 13 is further configured to, before the receiving unit 11 receives the indication information sent by the access node of the cellular access network, send capability information of the UE to the access node of the cellular access network, where the capability information of the UE indicates whether the UE supports data transmission both on the cellular access network and on the WLAN.

Optionally, the sending unit 13 is specifically configured to transmit, by using the WLAN, the first traffic flow to the policy and charging enforcement function PCEF entity.

The UE in this embodiment may be configured to execute a technical solution executed by a UE in the foregoing method embodiments, and implementation principles and technical effects of the UE are similar. For details, refer to related descriptions in the foregoing method embodiments, which are not described herein again.

In hardware implementation, the foregoing receiving unit 11 may be a receiver or a transceiver; the foregoing sending unit 13 may be a transmitter or a transceiver. In addition, the receiving unit 11 and the sending unit 13 may be integrated to constitute a transceiver unit, which, in hardware implementation, is a transceiver. The foregoing determining unit 12 may be built in or independent of a processor of the UE in a hardware form, or may be stored in a memory of the UE in a software form, so that the processor invokes and performs an operation corresponding to each of the foregoing units. The processor may be a central processing unit (CPU), a microprocessor, a single-chip microcomputer, or the like.

Figure 14:
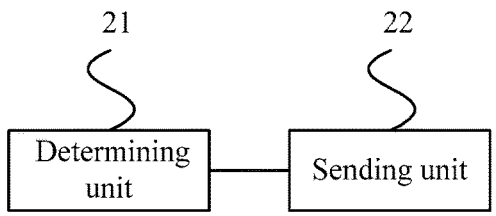
FIG. 14 is a schematic structural diagram of an access node of a cellular access network according to an embodiment of the present disclosure.

FIG. 14 is a schematic structural diagram of an access node of a cellular access network according to an embodiment of the present disclosure. As shown in FIG. 14, the access node of the cellular access network in this embodiment may include: a determining unit 21 and a sending unit 22. The determining unit 21 is configured to determine indication information, where the indication information includes a filtering condition, and the indication information is used to instruct user equipment UE to transmit, by using a wireless local area network WLAN, a traffic flow that meets the filtering condition; and the sending unit 22 is configured to send the indication information determined by the determining unit 21 to the user equipment UE.

The access node of the cellular access network in this embodiment may be configured to execute a technical solution executed by an access node of a cellular access network in the foregoing method embodiments, and implementation principles and technical effects of the access node of the cellular access network are similar. For details, refer to related descriptions in the foregoing method embodiments, which are not described herein again.

Figure 15:
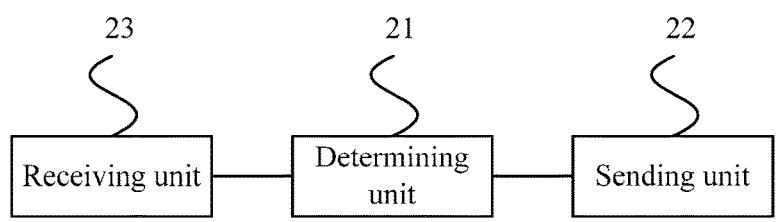
FIG. 15 is a schematic structural diagram of an access node of a cellular access network according to an embodiment of the present disclosure.

FIG. 15 is a schematic structural diagram of an access node of a cellular access network according to an embodiment of the present disclosure. As shown in FIG. 15, on the basis of the access node of the cellular access network shown in FIG. 14, the access node of the cellular access network in this embodiment further includes: a receiving unit 23. The receiving unit 23 is configured to, before the determining unit 21 determines the indication information, receive a first message sent by a policy and charging enforcement function PCEF entity, where the first message includes a transmission characteristic identifier, or includes the transmission characteristic identifier and a filter identifier corresponding to the transmission characteristic identifier. The determining unit 21 is further configured to determine, according to the transmission characteristic identifier received by the receiving unit 23, that a traffic flow that matches the filter corresponding to the transmission characteristic identifier is to be transmitted by using the WLAN, where the traffic flow that meets the filtering condition is the traffic flow that matches the filter corresponding to the transmission characteristic identifier.

In a first feasible implementation manner, the filtering condition includes a first identifier, where the first identifier includes at least one of the transmission characteristic identifier and the filter identifier, and the transmission characteristic identifier corresponds to the filter identifier; the traffic flow that meets the filtering condition includes: a first traffic flow, where the first traffic flow matches a first filter and filter information of the first filter includes the first identifier. Further, in a first case, the filtering condition further includes a bearer identifier, where the first filter is a filter of a bearer corresponding to the bearer identifier. In a second case, the filtering condition further includes a packet data network PDN connection identity or a PDN identity, where the first filter is a filter of a PDN connection corresponding to the PDN connection identity, or the first filter is a filter of a PDN connection corresponding to the PDN identity. Further, on the basis of the first case, the filtering condition further includes the packet data network PDN connection identity or the PDN identity, where the bearer corresponding to the bearer identifier is a bearer of the PDN connection corresponding to the PDN connection identity, or the bearer corresponding to the bearer identifier is a bearer of the PDN connection corresponding to the PDN identity.

In a second feasible implementation manner, the filtering condition include a bearer identifier, where the traffic flow that meets the filtering condition includes a first traffic flow, where the first traffic flow matches the first filter and the first filter is a filter of a bearer corresponding to the bearer identifier. Further, the filtering condition further includes a PDN connection identity or a PDN identity, where the bearer corresponding to the bearer identifier is a bearer of a PDN connection corresponding to the PDN connection identity, or the bearer corresponding to the bearer identifier is a bearer of a PDN connection corresponding to the PDN identity.

In a third feasible implementation manner, the filtering condition include the transmission characteristic identifier, where the traffic flow that meets the filtering condition includes a first traffic flow, where a transmission characteristic identifier of an application program corresponding to the first traffic flow is the transmission characteristic identifier.

Optionally, a differentiated services code point DSCP in an Internet Protocol IP header of a data packet of the first traffic flow carries the transmission characteristic identifier, or a header of a GPRS Tunneling Protocol for the user plane GTP-U packet that bears a data packet of the first traffic flow carries the transmission characteristic identifier.

Optionally, the indication information further includes an indication indicating whether to preserve an IP address of the UE; the indication information is further used to indicate whether to use, when the UE transmits the first traffic flow by using the WLAN, an IP address of the UE when the access node of the cellular access network transmits the first traffic flow.

Optionally, the determining unit 21 is specifically configured to determine, according to the transmission characteristic identifier and a combination of one or more types of the following information: a load status of the cellular access network, a load status of the WLAN, capability information of the UE, and a network connection state of the UE, to transmit, by using the WLAN, the traffic flow that matches the filter corresponding to the transmission characteristic identifier, where the capability information indicates whether the UE supports data transmission both on the cellular access network and on the WLAN, and the network connection state of the UE is whether the UE has accessed the WLAN.

Optionally, the receiving unit 23 is further configured to, before the determining unit 21 determines the indication information, receive the capability information that is of the UE and is sent by the UE.

Optionally, the determining unit 21 is specifically configured to receive a second traffic flow sent by a PCEF entity, where the second traffic flow carries the transmission characteristic identifier, and the transmission characteristic identifier corresponds to a filter that matches the second traffic flow; and separately collect, during a preset time, statistics about a combination of one or more types of the following information of the second traffic flow: traffic of the second traffic flow, a proportion of the traffic of the second traffic flow in traffic of all downlink traffic flows of the UE, a proportion of the traffic of the second traffic flow in traffic of a bearer that bears the second traffic flow, and a proportion of the traffic of the second traffic flow in traffic of a packet data network PDN connection by using which the second traffic flow is transmitted; and determine, according to the statistics collected about the combination of one or more types of the information of the second traffic flow, that the traffic flow that matches the filter corresponding to the transmission characteristic identifier is to be transmitted by using the WLAN.

Optionally, a differentiated services code point DSCP in an Internet Protocol IP header of a data packet of the second traffic flow carries the transmission characteristic identifier, or a header of a GPRS Tunneling Protocol for the user plane GTP-U packet that bears a data packet of the second traffic flow carries the transmission characteristic identifier.

Optionally, the sending unit 22 is further configured to send downlink indication information to the PCEF entity, where the downlink indication information instructs the PCEF entity to transmit, by using the WLAN, the traffic flow that matches the filter corresponding to the transmission characteristic identifier.

The downlink indication information further includes a PDN connection identity or a PDN identity, where the traffic flow that matches the filter corresponding to the transmission characteristic identifier is a traffic flow of a PDN connection corresponding to the PDN connection identity, or the traffic flow that matches the filter corresponding to the transmission characteristic identifier is a traffic flow of a PDN connection corresponding to the PDN identity.

The access node of the cellular access network in this embodiment may be configured to execute a technical solution executed by an access node of a cellular access network in the foregoing method embodiments, and implementation principles and technical effects of the access node of the cellular access network are similar. For details, refer to related descriptions in the foregoing method embodiments, which are not described herein again.

In hardware implementation, the foregoing sending unit 22 may be a transmitter or a transceiver; the foregoing receiving unit 23 may be a receiver or a transceiver. In addition, the sending unit 22 and the receiving unit 23 may be integrated to constitute a transceiver unit, which, in hardware implementation, is a transceiver. The foregoing determining unit 21 may be built in or independent of a processor of the access node of the cellular access network in a hardware form, or may be stored in a memory of the access node of the cellular access network in a software form, so that the processor invokes and performs an operation corresponding to each of the foregoing units. The processor may be a CPU, a microprocessor, a single-chip microcomputer, or the like.

Figure 16:
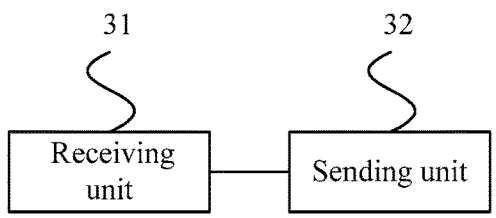
FIG. 16 is a schematic structural diagram of a PCEF entity according to an embodiment of the present disclosure.

FIG. 16 is a schematic structural diagram of a PCEF entity according to an embodiment of the present disclosure. As shown in FIG. 16, the PCEF entity in this embodiment may include: a receiving unit 31 and a sending unit 32. The receiving unit 31 is configured to receive a transmission characteristic identifier sent by a policy and charging rules function PCRF entity. The sending unit 32 is configured to send a first message to an access node of a cellular access network according to the transmission characteristic identifier received by the receiving unit 31, where the first message includes the transmission characteristic identifier, or includes the transmission characteristic identifier and a filter identifier corresponding to the transmission characteristic identifier, and the transmission characteristic identifier is used to instruct the access node of the cellular access network to determine whether a traffic flow that matches a filter corresponding to the transmission characteristic identifier is to be transmitted by using a wireless local area network WLAN.

The PCEF entity in this embodiment may be configured to execute a technical solution executed by a PCEF entity in the foregoing method embodiments, and implementation principles and technical effects of the PCEF entity are similar. For details, refer to related descriptions in the foregoing method embodiments, which are not described herein again.

Figure 17:
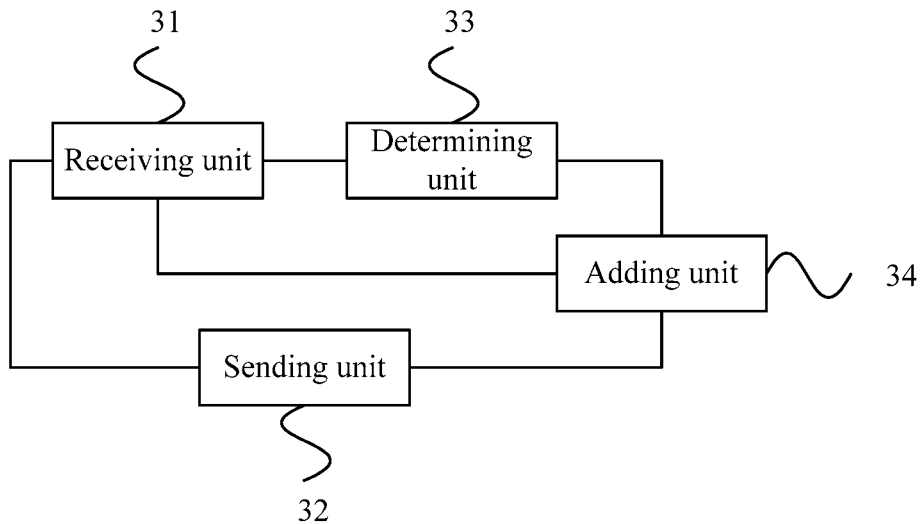
FIG. 17 is a schematic structural diagram of a PCEF entity according to an embodiment of the present disclosure.

FIG. 17 is a schematic structural diagram of a PCEF entity according to an embodiment of the present disclosure. As shown in FIG. 17, the PCEF entity in this embodiment is based on a structure of a PCEF entity shown in FIG. 16. Further, the receiving unit 31 is specifically configured to receive a policy control and charging PCC rule sent by the PCRF, where the PCC rule includes a filter corresponding to the transmission characteristic identifier, filter information of the filter, and quality of service QoS information corresponding to the filter, and the filter information of the filter includes the transmission characteristic identifier.

Further, in a first feasible implementation manner, the PCEF entity may further include: a determining unit 33 and an adding unit 34. The determining unit 33 is configured to determine, according to the QoS information received by the receiving unit 31, a bearer that transmits the traffic flow that matches the filter. The adding unit 34 is configured to add the filter and the filter information of the filter that are received by the receiving unit 31 to a traffic flow template TFT corresponding to the bearer. The sending unit 32 is further configured to send the TFT to the UE.

In a second feasible implementation manner, the PCEF entity may further include: a determining unit 33 and an adding unit 34. The determining unit 33 is configured to determine, according to the transmission characteristic identifier received by the receiving unit 31, a bearer that transmits the traffic flow that matches the filter. The adding unit 34 is configured to add the filter received by the receiving unit 31 to a traffic flow template TFT corresponding to the bearer determined by the determining unit 33. The sending unit 32 is further configured to send the TFT to the UE.

Optionally, the transmission characteristic identifier is at least one identifier of a radio access technology RAT selection priority identifier, an IP address preservation requirement identifier, and a traffic flow importance identifier; or the transmission characteristic identifier is used to identify a combination of at least one piece of information of RAT selection priority information, IP address preservation requirement information, and traffic flow importance information.

Optionally, the receiving unit 31 is further configured to receive capability information that is of the UE and is sent by the access node of the cellular access network, where the capability information of the UE indicates whether the UE supports data transmission both on the cellular access network and on the WLAN.

Optionally, the sending unit 32 is further configured to send the capability information that is of the UE and is received by the receiving unit 31 to the PCRF entity, so that the PCRF entity formulates the PCC rule according to a capability of the UE.

Optionally, the sending unit 32 is further configured to, when the capability information of the UE indicates that the UE supports data transmission both on the cellular access network and on the WLAN, determine to send a third traffic flow to the UE by using the WLAN, where the third traffic flow is the traffic flow that matches the filter corresponding to the transmission characteristic identifier.

Optionally, the sending unit 32 is specifically configured to determine, according to a first traffic flow that is sent by the UE and is received by using the WLAN, to transmit the third traffic flow by using the WLAN to the UE, where the first traffic flow is the traffic flow that matches the filter corresponding to the transmission characteristic identifier.

Optionally, the sending unit 32 is specifically configured to determine, according to a preset policy, to transmit the third traffic flow to the UE by using the WLAN.

Optionally, the sending unit 32 is specifically configured to determine, according to downlink indication information sent by the access node of the cellular access network, to send the third traffic flow to the UE by using the WLAN, where the downlink indication information is used to instruct the PCEF entity to transmit, by using the WLAN, the traffic flow that matches the filter corresponding to the transmission characteristic identifier.

Optionally, the downlink indication information further includes a PDN connection identity or a PDN identity, where the traffic flow that matches the filter corresponding to the transmission characteristic identifier is a traffic flow of a PDN connection corresponding to the PDN connection identity, or the traffic flow that matches the filter corresponding to the transmission characteristic identifier is a traffic flow of a PDN connection corresponding to the PDN identity.

The PCEF entity in this embodiment may be configured to execute a technical solution executed by a PCEF entity in the foregoing method embodiments, and implementation principles and technical effects of the PCEF entity are similar. For details, refer to related descriptions in the foregoing method embodiments, which are not described herein again.

In hardware implementation, the foregoing receiving unit 31 may be a receiver or a transceiver; the foregoing sending unit 32 may be a transmitter or a transceiver. In addition, the receiving unit 31 and the sending unit 32 may be integrated to constitute a transceiver unit, which, in hardware implementation, is a transceiver. The foregoing determining unit 33 and adding unit 34 may be built in or independent of a processor of the PCEF entity in a hardware form, or may be stored in a memory of the PCEF entity in a software form, so that the processor invokes and performs an operation corresponding to each of the foregoing units. The processor may be a CPU, a microprocessor, a single-chip microcomputer, or the like.

Figure 18:
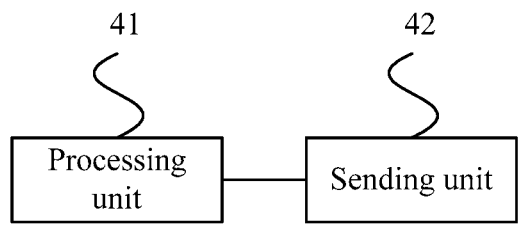
FIG. 18 is a schematic structural diagram of a PCRF entity according to an embodiment of the present disclosure.

FIG. 18 is a schematic structural diagram of a PCRF entity according to an embodiment of the present disclosure. As shown in FIG. 18, the PCRF entity in this embodiment may include: a processing unit 41 and a sending unit 42. The processing unit 41 is configured to formulate a policy control and charging PCC rule.

The sending unit 42 is configured to send the PCC rule formulated by the processing unit 41 to a policy and charging enforcement function PCEF entity, where the PCC rule includes a transmission characteristic identifier, and the transmission characteristic identifier is used to instruct an access node of a cellular access network to determine whether a traffic flow that matches a filter corresponding to the transmission characteristic identifier is to be transmitted by using a wireless local area network WLAN.

The PCRF entity in this embodiment may be configured to execute a technical solution executed by a PCRF entity in the foregoing method embodiments, and implementation principles and technical effects of the PCRF entity are similar. For details, refer to related descriptions in the foregoing method embodiments, which are not described herein again.

Figure 19:
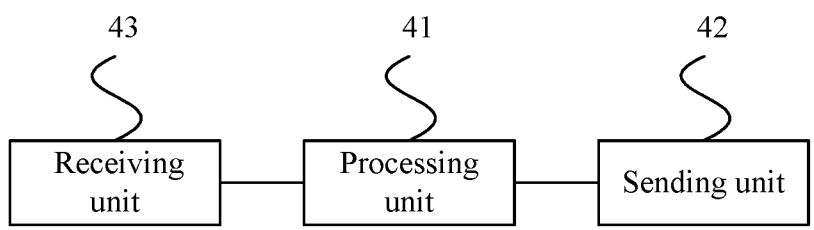
FIG. 19 is a schematic structural diagram of a PCRF entity according to an embodiment of the present disclosure.

FIG. 19 is a schematic structural diagram of a PCRF entity according to an embodiment of the present disclosure. As shown in FIG. 19, the PCRF entity in this embodiment is based on a structure of the PCRF entity shown in FIG. 18. Further, the processing unit 41 is specifically configured to formulate the PCC rule according to capability information of a UE, where the capability information of the UE indicates whether the UE supports data transmission both on the cellular access network and on the WLAN.

Further, the PCRF entity may include: a receiving unit 43, where the receiving unit 43 is configured to, before the processing unit 41 formulates the PCC rule according to the capability information of the UE, receive the capability information that is of the UE and is sent by the PCEF entity.

Optionally, the transmission characteristic identifier is at least one identifier of a radio access technology RAT selection priority identifier, an IP address preservation requirement identifier, and a traffic flow importance identifier; or the transmission characteristic identifier is used to identify a combination of at least one piece of information of RAT selection priority information, IP address preservation requirement information, and traffic flow importance information.

Optionally, the sending unit 42 is specifically configured to send, according to a trigger condition for IP-connectivity access network IP-CAN session modification, the PCC rule formulated by the processing unit 41 to the PCEF entity, where the trigger condition for the IP-CAN session modification includes at least one of the following: UE location change information, information about operator service usage of the UE, and traffic flow content information of the UE, and the information about operator service usage of the UE includes at least one of the following: package information, balance information, account change information, network load adjustment information, and UE subscription change information.

The PCRF entity in this embodiment may be configured to execute a technical solution executed by a PCRF entity in the foregoing method embodiments, and implementation principles and technical effects of the PCRF entity are similar. For details, refer to related descriptions in the foregoing method embodiments, which are not described herein again.

In hardware implementation, the foregoing sending unit 42 may be a transmitter or a transceiver; the foregoing receiving unit 43 may be a receiver or a transceiver. In addition, the sending unit 42 and the receiving unit 43 may be integrated to constitute a transceiver unit, which, in hardware implementation, is a transceiver. The foregoing processing unit 41 may be built in or independent of a processor of the PCRF entity in a hardware form, or may be stored in a memory of the PCRF entity in a software form, so that the processor invokes and performs an operation corresponding to each of the foregoing units. The processor may be a CPU, a microprocessor, a single-chip microcomputer, or the like.

A person of ordinary skill in the art may understand that all or some of the steps of the method embodiments may be implemented by a program instructing relevant hardware. The program may be stored in a computer readable storage medium. When the program runs, the steps of the method embodiments are performed. The foregoing storage medium includes: any medium that can store program code, such as a ROM, a RAM, a magnetic disk, or an optical disc.

Finally, it should be noted that the foregoing embodiments are merely intended for describing the technical solutions of the present disclosure, but not for limiting the present disclosure. Although the present disclosure is described in detail with reference to the foregoing embodiments, persons of ordinary skill in the art should understand that they may still make modifications to the technical solutions described in the foregoing embodiments or make equivalent replacements to some or all technical features thereof, without departing from the scope of the technical solutions of the embodiments of the present disclosure.

What is claimed is:

1. A data transmission method comprising:
   receiving, by a user equipment (UE), a first filter used by the UE to match traffic flow, wherein filter information of the first filter comprises a transmission characteristic identifier that is any one or any combination of the following: a radio access technology (RAT) selection priority identifier, an Internet Protocol (IP) address preservation requirement identifier, and a traffic flow importance identifier;
   sending, by the UE, capability information of the UE to the access node, wherein the capability information of the UE indicates whether the UE supports data transmission both on the cellular access network and on the WLAN;
   receiving, by the UE, indication information from an access node of a cellular access network, wherein the indication information comprises the transmission characteristic identifier for instructing the UE to transmit a specific traffic flow using a wireless local area network (WLAN);
   determining, by the UE, a first traffic flow matched by the first filter, wherein filter information of the first filter comprises the transmission characteristic identifier; and
   transmitting, by the UE, the first traffic flow using the WLAN.

2. The method according to claim 1, wherein the transmission characteristic identifier is used to identify a combination of at least one piece of information of RAT selection priority information, IP address preservation requirement information, and traffic flow importance information.

3. A data transmission method comprising:
   determining, by an access node, according to a transmission characteristic identifier and a combination of one or more types of the following information:
   a) a load status of a cellular access network,
   b) a load status of a wireless local area network (WLAN),
   c) capability information of user equipment (UE), and
   d) a network connection state of the UE,
   that a specific traffic flow matched by at least one filter is to be transmitted by using the WLAN, wherein the capability information of the UE indicates whether the UE supports data transmission both on the cellular access network and on the WLAN, and the network connection state is whether the UE has accessed the WLAN;
   determining, by the access node of the cellular access network, indication information that comprises the transmission characteristic identifier for instructing user equipment (UE) to transmit the specific traffic flow using the WLAN,
   wherein the transmission characteristic identifier is used to identify at least one filter and is any one or any combination of the following: a radio access technology (RAT) selection priority identifier, an Internet Protocol (IP) address preservation requirement identifier, and a traffic flow importance identifier, wherein filter information of the at least one filter comprise the transmission characteristic identifier and the at least one filter is used by the UE to match specific traffic flow; and
   sending, by the access node of the cellular access network, the indication information to the UE.

4. The method according to claim 3, wherein the transmission characteristic identifier is used to identify a combination of at least one piece of information of RAT selection priority information, IP address preservation requirement information, and traffic flow importance information.

5. A user equipment (UE) comprising:
   a memory storing instructions; and
   a processor coupled to the memory to execute the instructions, the instructions comprising:
   instructions for sending capability information of the UE to the access node of the cellular access network, wherein the capability information of the UE indicates whether the UE supports data transmission both on the cellular access network and on the WLAN;
   instructions for receiving a first filter used by the UE to match a traffic flow, wherein filter information of the first filter comprises a transmission characteristic identifier that is any one or any combination of the following: a radio access technology (RAT) selection priority identifier, an Internet Protocol (IP) address preservation requirement identifier, and a traffic flow importance identifier;
   instructions for receiving indication information from an access node of a cellular access network, wherein the indication information comprises the transmission characteristic identifier for instructing the UE to transmit a specific traffic flow using a wireless local area network (WLAN);

instructions for determining a first traffic flow matched by the first filter, wherein filter information of the first filter comprises the transmission characteristic identifier; and instructions for transmitting the first traffic flow using the WLAN.

6. The UE according to claim 5, wherein the transmission characteristic identifier is used to identify a combination of at least one piece of information of RAT selection priority information, IP address preservation requirement information, and traffic flow importance information.

7. An access node of a cellular access network, the access node comprising:

a memory storing instructions; and a processor coupled to the memory to execute the instructions, the instructions comprising:

instructions for determining according to a transmission characteristic identifier and a combination of one or more types of the following information:

a) a load status of a cellular access network, b) a load status of using a wireless local area network (WLAN), c) capability information of user equipment (UE), and d) a network connection state of the UE, that the specific traffic flow matched by the at least one filter is to be transmitted by using the WLAN, wherein the capability information of the UE indicates whether the UE supports data transmission both on the cellular access network and on the WLAN, and the network connection state is whether the UE has accessed the WLAN;

instructions for determining indication information that comprises the transmission characteristic identifier for instructing the UE to transmit the specific traffic flow using the WLAN, wherein the transmission characteristic identifier is used to identify at least one filter and is any one or any combination of the following: a radio access technology (RAT) selection priority identifier, an Internet Protocol (IP) address preservation requirement identifier, and a traffic flow importance identifier, and wherein filter information of the at least one filter comprise the transmission characteristic identifier and the at least one filter is used by the UE to match specific traffic flow; and instructions for sending the indication information to the UE.

8. The access node of the cellular access network according to claim 7, wherein the transmission characteristic identifier is used to identify a combination of at least one piece of information of RAT selection priority information, IP address preservation requirement information, and traffic flow importance information.

9. A data transmission system comprising an access node of a cellular access network, wherein the access node is configured to:

determine according to a transmission characteristic identifier and a combination of one or more types of the following information:

a) a load status of the cellular access network, b) a load status of the WLAN, c) capability information of user equipment (UE), and d) a network connection state of the UE, that a specific traffic flow identified by at least one filter is to be transmitted by using a wireless local area network (WLAN) before determining indication information, wherein the capability information of the UE indicates whether the UE supports data transmission both on the cellular access network and on the WLAN, and the network connection state is whether the UE has accessed the WLAN;

determine indication information that comprises the transmission characteristic identifier for instructing the UE to transmit the specific traffic flow using the WLAN, wherein the transmission characteristic identifier is used to identify at least one filter and is any one or any combination of the following: a radio access technology (RAT) selection priority identifier, an Internet Protocol (IP) address preservation requirement identifier, and a traffic flow importance identifier, and wherein filter information of the at least one filter comprises the transmission characteristic identifier and the at least one filter is used by the UE to match the specific traffic flow; and send the indication information to the UE.

* * * * *